(12) United States Patent
Takuhara et al.

(10) Patent No.: US 7,758,156 B2
(45) Date of Patent: Jul. 20, 2010

(54) IMAGE FORMING METHOD, IMAGE FORMING APPARATUS, AND INK JET RECORDING APPARATUS

(75) Inventors: Hiroyuki Takuhara, Yaita (JP); Hiroshi Tomioka, Tokyo (JP); Minako Kawabe, Tokyo (JP); Satomi Yanagimachi, Yokosuka (JP); Yuuki Nishino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 627 days.

(21) Appl. No.: 11/769,229

(22) Filed: Jun. 27, 2007

(65) Prior Publication Data

US 2007/0242100 A1      Oct. 18, 2007

Related U.S. Application Data

(63) Continuation of application No. PCT/JP2007/055153, filed on Mar. 8, 2007.

(30) Foreign Application Priority Data

Mar. 9, 2006      (JP) .............................. 2006-064316

(51) Int. Cl.
*B41J 2/21*      (2006.01)
(52) U.S. Cl. .............................. 347/43; 347/96; 347/100

(58) Field of Classification Search .................. 347/40, 347/43, 95, 96, 100, 101; 106/31.13, 31.27, 106/31.6; 523/160
See application file for complete search history.

(56) References Cited

U.S. PATENT DOCUMENTS

| 4,723,129 A | 2/1988 | Endo et al. |
| 4,740,796 A | 4/1988 | Endo et al. |
| 5,609,671 A | 3/1997 | Nagasawa |

(Continued)

FOREIGN PATENT DOCUMENTS

EP      0997506 A1      5/2000

(Continued)

*Primary Examiner*—Juanita D Stephens
(74) *Attorney, Agent, or Firm*—Fitzpatrick, Cella, Harper & Scinto

(57) ABSTRACT

An image forming method using a black ink containing a pigment, a black ink containing a dye, and a reactive color ink capable of unstabilizing the dispersion state of the pigment in the black ink, wherein the method includes one of the steps of, on at least part of a region to which the black ink is to be applied, applying the reactive color ink, the black ink, and the black ink in that order so as to overlap, thereby applying these inks to a recording medium; and applying the black ink, the black ink, and the reactive color ink in that order so as to overlap, thereby applying these inks to a recording medium.

8 Claims, 8 Drawing Sheets

U.S. PATENT DOCUMENTS

| | | |
|---|---|---|
| 5,976,230 A | 11/1999 | Askeland et al. |
| 6,126,268 A | 10/2000 | Askeland et al. |
| 6,281,267 B2 | 8/2001 | Parazak |
| 6,300,391 B2 | 10/2001 | Parazak et al. |
| 6,309,062 B1 | 10/2001 | Hickman et al. |
| 6,435,658 B1 | 8/2002 | Kato et al. |
| 6,540,329 B1 | 4/2003 | Kaneko et al. |
| 6,688,730 B2 * | 2/2004 | Asaki et al. .......... 347/64 |
| 6,786,587 B2 * | 9/2004 | Koitabashi .......... 347/96 |
| 2001/0008908 A1 | 7/2001 | Parazak |
| 2001/0018472 A1 | 8/2001 | Parazak et al. |
| 2002/0060716 A1 | 5/2002 | Kato et al. |
| 2005/0206702 A1 | 9/2005 | Yamashita et al. |

FOREIGN PATENT DOCUMENTS

| | | |
|---|---|---|
| EP | 1184187 | 3/2002 |
| JP | 63-1526841 A | 6/1988 |
| JP | 64-6074 A | 1/1989 |
| JP | 8-3498 A | 1/1996 |
| JP | 11-343441 A | 12/1999 |
| JP | 2001-150793 A | 6/2001 |
| JP | 2001-152059 A | 6/2001 |
| JP | 2001-152063 A | 6/2001 |
| JP | 2002-154263 A | 5/2002 |
| JP | 2005-120217 A | 5/2005 |
| JP | 2005-262576 A | 9/2005 |

* cited by examiner

IMAGE FORMING METHOD, IMAGE FORMING APPARATUS, AND INK JET RECORDING APPARATUS

This application is a continuation of International Application No. PCT/JP2007/055153, filed on Mar. 8, 2007, which claims the benefit of Japanese Patent Application No. 2006-064316 filed on Mar. 9, 2006.

BACKGROUND OF THE INVENTION

1. Field of the Invention

The present invention relates to an image forming method, an image forming apparatus, and an ink jet recording apparatus.

2. Description of the Related Art

An ink containing a pigment (pigment ink) as a coloring material providing recorded matter having high image density and excellent in durability and the like has conventionally been used as an ink for writing materials (a fountain pen, a felt pen, a water-based ballpoint pen, etc.) or an ink for use in a ink jet recording method. As the pigment ink, there have been proposed, for example, a black ink containing carbon black and a dispersant and a black ink containing a self dispersion carbon black enabling the pigment to be dispersed without employing a dispersant (see Japanese Patent Application Laid-Open Nos. S63-152681, S64-006074 and H08-003498).

Full-color recorded matter has been commonly used in recent years for various reporting documents and notice materials in offices, schools, stores, and the like. Thus, there is a need to form not only a black image but also a high-quality full-color image. In forming a full-color image, a wide variety of plain papers are used as recording media, such as copying paper, writing paper, notebooks, letter paper, bond paper, and continuous form paper. In addition, a plain paper containing a recycled material has come to be widely used as a recording medium in view of recent demands for environmental protection and resource conservation. Thus, the ink is studied from various aspects such as its composition and physical properties in order to form a high-quality image even when a wide range of plain papers are used as recording media.

An ink jet recording method uses a pigment ink as described above, as a black ink, and forms a full-color image by combination with other color inks. Specific examples of the color ink include at least one selected from magenta ink, cyan ink, yellow ink, red ink, green ink, and blue ink. Here, in a typical ink set, the characteristics of each ink are sometimes controlled as described below. Specifically, the permeability of the color inks into recording media is relatively increased for improved fixability of the inks and reduced occurrence of bleeding between the color inks. In addition, the permeability of the black ink into recording media is set to a relatively lower level than that of the color inks for improved character quality. The formation of an image with an ink set having the foregoing black and color inks may pose problems as described below. Specifically, there may occur a phenomenon in which bleeding appears at the boundary portion between images formed with the black and color inks and a phenomenon in which the image quality is lowered by non-uniform mixing of the black and color inks. For reduction of the occurrence of the bleeding, there has been proposed a recording method involving using a first ink and a second ink capable of reacting with the first ink to supply the second ink to a region to which the first ink is applied to overlap (see Japanese Patent Application Laid-Open No. H11-343441).

When a color ink and a black ink containing a pigment are applied so as to overlap with each other for reduction of the occurrence of the bleeding, the density and color tone of the resultant image vary (that is, color unevenness may occur) depending on the order of applying the color and black inks. For suppression of the color unevenness, there have been proposed an ink set and an image recording method in which the black ink contains a pigment and a salt and the color inks contain a component unstabilizing the dispersion state of the pigment in the black ink (see Japanese Patent Application Laid-Open Nos. 2001-150793 and 2001-152059).

In recent years, in ink jet recording, a method has been carried out which involves causing a recording head to conduct bi-directional scanning twice or more in the main scanning direction to record an image having the same width as the length of the head (herein after referred to as multi-pass recording) in order to make image quality more excellent. However, the multi-pass recording sometimes does not enable sufficient reduction of recording time even when the number of nozzles is increased or even when the length of the recording head is increased. Accordingly, to reduce the recording time, there are attempted a method involving recording an image in each of the forward and return directions of the main scanning (hereinafter referred to as bi-directional recording) and a method involving recording, by one main scanning, an image having the same width as the length of a recording head (hereinafter referred to as single-pass recording). Recording with a combination of single-pass and bi-directional recordings, i.e., single-pass bi-directional recording, eliminates the need to conduct scanning to an identical position on a recording medium plural times, which can greatly reduce the recording time. However, as a result of studies of the present inventors, it has been found that high-speed recording such as the single-pass bi-directional recording poses the following problems. Specifically, such a problem as to generate bleeding markedly has been found out. In addition, such a further problem as to generate color unevenness prominently has been found out when a black ink and a color ink capable of reacting with the black ink are applied so as to overlap with each other as in the invention disclosed in Japanese Patent Application Laid-Open Nos. 2001-150793 and 2001-152059 to reduce the occurrence of bleeding. The single-pass bi-directional recording renders the color unevenness prominent particularly in an image in which an image region recorded by overlaying a black ink with a color ink and an image region recorded by overlaying a color ink with a black ink coexist. In other words, the inventions described in the above Japanese Patent Application Laid-Open Nos. 2001-150793 and 2001-152059 are inadequate as methods for forming, at high speed, a high-level high-quality image as required in recent years even when a wide variety of plain papers are used as recording media.

Thus, an object of the present invention is to provide an image forming method, an image forming apparatus and an ink jet recording apparatus which can suppress the occurrence of bleeding and color unevenness even when bi-directional recording is performed and can provide high image quality.

SUMMARY OF THE INVENTION

The above object is achieved by the present invention described below. Specifically, the image forming method according to the present invention is an image forming method using a black ink 1 containing a pigment, a black ink 2 containing a dye, and a reactive color ink capable of unstabilizing the dispersion state of the pigment in the black ink 1, wherein the method includes one of the steps of, on at least part of a region to which the black ink 1 is to be applied, applying the reactive color ink, the black ink 1, and the black ink 2 in that order so as to overlap, thereby applying these inks to a recording medium; and applying the black ink 2, the black ink 1, and the reactive color ink in that order so as to overlap, thereby applying these inks to a recording medium.

In addition, the image forming method according to another embodiment of the present invention is an image forming method using a black ink 1 containing a pigment, a black ink 2 containing a dye, and a reactive color ink capable of unstabilizing the dispersion state of the pigment in the black ink 1 to form an image by bi-directional recording, wherein the method includes the steps of, on at least part of a region to which the black ink 1 is to be applied, (1) applying the reactive color ink, the black ink 1, and the black ink 2 in that order so as to overlap, thereby applying these inks to a recording medium; and (2) applying the black ink 2, the black ink 1, and the reactive color ink in that order so as to overlap, thereby applying these inks to a recording medium, and wherein the forward recording process of the bi-directional recording includes one of the steps (1) and (2) and the return recording process of the bi-directional recording includes the other step.

The image forming apparatus according to another embodiment of the present invention is an image forming apparatus using a black ink 1 containing a pigment, a black ink 2 containing a dye, and a reactive color ink capable of unstabilizing the dispersion state of the pigment in the black ink 1, wherein the apparatus includes either one of a unit for, on at least part of a region to which the black ink 1 is to be applied, applying the reactive color ink, the black ink 1, and the black ink 2 in that order so as to overlap, thereby applying these inks to a recording medium; and a unit for, on at least part of a region to which the black ink 1 is to be applied, applying the black ink 2, the black ink 1, and the reactive color ink in that order so as to overlap, thereby applying these inks to a recording medium.

In addition, the ink jet recording apparatus according to another embodiment of the present invention is an ink jet recording apparatus having a unit for forming an image by bi-directional recording and using a black ink 1 containing a pigment, a black ink 2 containing a dye, and a reactive color ink capable of unstabilizing the dispersion state of the pigment in the black ink 1, wherein the apparatus includes at last a unit 1 for, on at least part of a region to which the black ink 1 is to be applied, applying the reactive color ink, the black ink 1, and the black ink 2 in that order so as to overlap, thereby applying these inks to a recording medium; and a unit 2 for, on at least part of a region to which the black ink 1 is to be applied, applying the black ink 2, the black ink 1, and the reactive color ink in that order so as to overlap, thereby applying these inks to a recording medium; and wherein the forward recording process of the bi-directional recording uses one of the units 1 and 2 and the return recording process of the bi-directional recording uses the other unit.

The present invention enables the occurrence of bleeding and color unevenness to be reduced, and can provide an image forming method, an image forming apparatus and an ink jet recording apparatus which can offer high image quality.

Further features of the present invention will become apparent from the following description of exemplified embodiments with reference to the attached drawings.

DESCRIPTION OF THE EMBODIMENTS

Figure 1A:
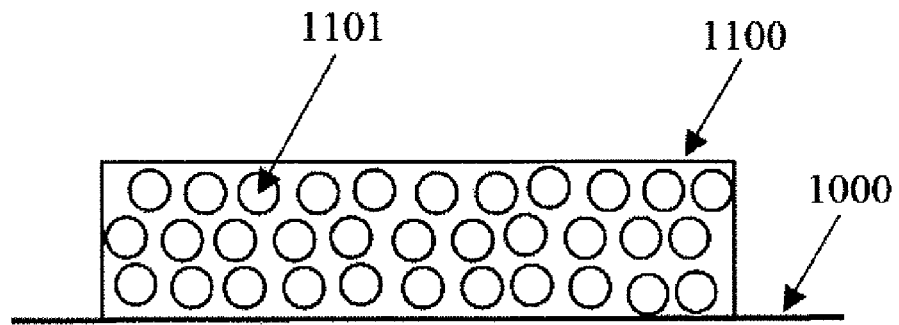
FIGS. 1A, 1B and 1C are conceptual diagrams for the case where inks are applied in the order of black ink 1 and reactive color ink.

The present invention is described below in detail with reference to preferred embodiments thereof.

Incidentally, when the coloring material is a salt, the salt is present in a state dissociated into ions in an ink, which is, however, expressed as "salt is contained" for convenience according to the present invention.

<Image Forming Method>

The image forming method according to the present invention is an image forming method using a black ink 1 containing a pigment, a black ink 2 containing a dye, and a reactive color ink capable of unstabilizing the dispersion state of the pigment in the black ink 1, wherein the method includes one of the steps of, on at least part of a region to which the black ink 1 is to be applied, applying the reactive color ink, the black ink 1, and the black ink 2 in that order so as to overlap, thereby applying these inks to a recording medium; and applying the black ink 2, the black ink 1, and the reactive color ink in that order so as to overlap, thereby applying these inks to a recording medium.

In particular, the image forming method according to the present invention preferably includes the steps of, on at least part of a region to which the black ink 1 is to be applied, (1) applying the reactive color ink, the black ink 1, and the black ink 2 in that order so as to overlap, thereby applying these inks to a recording medium; and (2) applying the black ink 2, the black ink 1, and the reactive color ink in that order so as to overlap, thereby applying these inks to a recording medium, and wherein a forward recording process includes one of the steps (1) and (2) and a return recording process includes the other step.

For the purpose of the present invention, a component which unstabilizes the dispersion state of a pigment and is contained in the reactive color ink is hereinafter referred to as "reactive component". In addition, a color ink not containing a component which unstabilizes the dispersion state of a pigment in the black ink 1, i.e., a reactive component, is referred to as "non-reactive color ink".

According to the present invention, the step of applying inks to a recording medium is specifically as follows. First, one of the reactive color ink and the black ink 2 is applied to at least part of a region to which the black ink 1 is to be applied. Then, the black ink 1 is applied to at least part of the region to which one of the reactive color ink and the black ink 2 has been applied. Subsequently, the other one of the black ink 2 and reactive color ink is applied onto at least part of the region to which the reactive color ink or the black ink 2 has been applied and the black ink 1 has been further applied.

Here, the application amount of each of the black ink 2 and the reactive color ink is preferably 1/100 or more to 30/100 or less of that of the black ink 1. Thus, the application amount of each of the black ink 2 and the reactive color ink is preferably 1 or more to 30 or less with the application amount of the black ink 1 being 100. The total application amount of the black ink 2 and the reactive color ink is preferably 2/100 or more to 50/100 or less of that of the black ink 1. Thus, the total application amount of the black ink 2 and the reactive color ink is preferably 2 or more to 50 or less with the application amount of the black ink 1 being 100. The reason that the application amount of each ink is set to the above range is as follows. An insufficient application amount of each of the black ink 2 and the reactive color ink relative to that of the black ink 1 may not provide sufficient advantages of the present invention. An excessive application amount of each of the black ink 2 and the reactive color ink relative to that of the black ink 1 may induce the occurrence of new bleeding to lower the image quality.

An excessive or insufficient application amount of one of the black ink 2 and the reactive color ink may not also provide sufficient advantages of the present invention. For that reason, the application amount ratio of the black ink 2 to the reactive color ink (black ink 2:reactive color ink) is preferably 1:5 to 5:1. Thus, the application amount of the black ink is preferably 20 or more to 500 or less with the application amount of the reactive color ink being 100.

According to the present invention, the above-described configuration of the image forming method can be used to reduce the occurrence of bleeding and color unevenness even when the recording is performed at high speed as with single-pass bi-directional recording. Specifically, applying the reactive color ink and the black ink 1 containing a pigment so as to overlap to reduce the occurrence of bleeding can reduce the color unevenness generated owing to a difference in the order of applying the reactive color ink and the black ink 1. The reason why the advantage is obtained is not clearly apparent; however, the result of studies by the present inventors suggests that the advantage is due to a mechanism as described below.

[Mechanism of Image Formation in a Conventional Image Forming Method]

In speculating about the reason why the advantage of the present invention is obtained, there will be first described a case where the black ink 2 is not used, that is, a conventional image forming method involving applying only the reactive color ink and the black ink 1 so as to overlap to form an image. With reference to FIGS. 1A to 1C and FIGS. 2D to 2F, a case is here by way of example considered where for single-pass bi-directional recording, the order of applying the reactive color ink and the black ink 1 is different between forward and return recording processes.

In the following consideration, each ink is assumed to have a conventional design as described below. Specifically, the color ink and the black ink 2 have a relatively high permeability into a recording medium for improved fixability of the inks and reduced occurrence of bleeding between color inks. The black ink 1 has a low permeability into the recording medium compared to that of the color ink and the black ink 2 for improvement of character quality. In other words, the color ink and the black ink 2 is assumed to be set to have a higher permeability into the recording medium than that of the black ink 2.

Figure 1B:
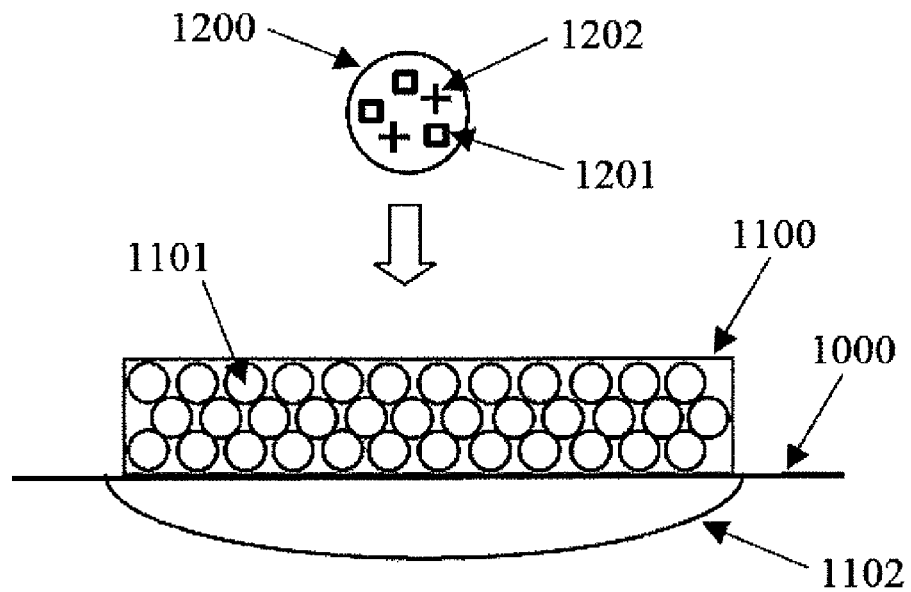
Figure 1C:
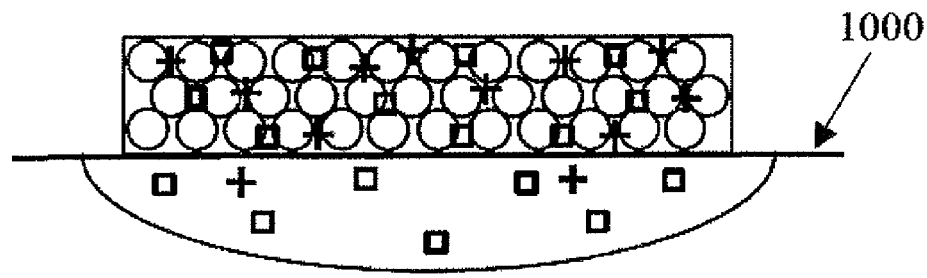

Step of applying a black ink 1 and a reactive color ink in that order in forward recording process FIGS. 1A to 1C are conceptual diagrams for the case where inks are applied in the order of black ink 1 and reactive color ink. First, applying a black ink 1 (1100) to a recording medium (1000) allows the black ink to cover the recording medium (1000) as shown in FIG. 1A. In this respect, the black ink 1 has such a characteristic that permeation into a recording medium is relatively slow. Then, as shown in FIG. 1B, a pigment (1101) in the black ink 1 (1100) starts to aggregate on the surface of the recording medium (1000), while an aqueous medium (1102) in the black ink 1 (1100) starts to permeate into the recording medium. Here, a reactive color ink (1200) containing a dye (1201) and a reactive component (1202) is applied to the black ink 1 so as to overlap. At this time, the reactive color ink, which has such a characteristic that permeation into a recording medium is easy, diffuses quickly and uniformly in a layer of the black ink 1 (1100) on the surface of the recording medium (1000). Then, as shown in FIG. 1C, the aggregation of the pigment proceeds abruptly and uniformly on the recording medium (1000) by the effects of the pigment on the surface of the recording medium (1000) and the reactive component (1202) in the reactive color ink; the pigment is present being uniformly distributed in the vicinity of the surface of the recording medium. As a result, a uniform image is obtained.

Figure 2D:
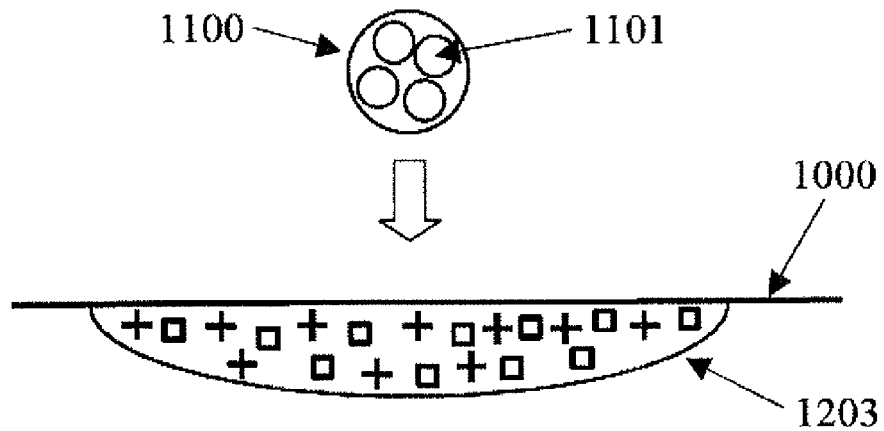
FIGS. 2D, 2E and 2F are conceptual diagrams for the case where inks are applied in the order of reactive color ink and black ink 1.
Figure 2E:
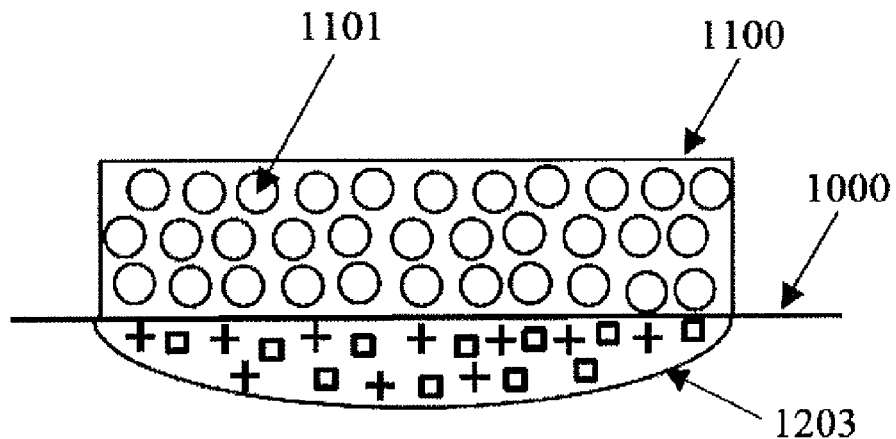
Figure 2F:
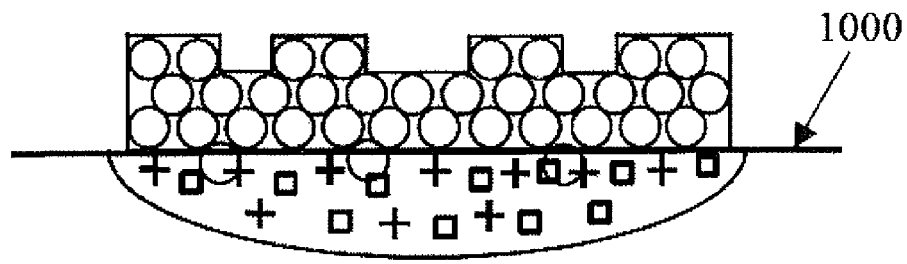

Step of applying the reactive color ink and the black ink 1 in that order in return recording process FIGS. 2D to 2F are conceptual diagrams for the case where the inks are applied in the order of reactive color ink and black ink 1. First, when the reactive color ink is applied to the recording medium (1000), the reactive color ink, which has such a characteristic that permeation into a recording medium is easy, permeates (1203) into the recording medium (1000), as shown in FIG. 2D. Then, the black ink 1 (1100) containing the pigment (1101) is applied so as to overlap on the reactive color ink. At this time, as shown in FIG. 2E, the black ink 1 (1100), which has such a characteristic that permeation into a recording medium is relatively slow, covers the recording medium (1000). Here, the diffusion of the black ink 1 into a layer of the reactive color ink (1203) previously applied to the recording medium proceeds slowly and non-uniformly because the black ink 1 permeates relatively less easily into the medium. Simultaneously, the pigment (1101) in the black ink 1 (1100) aggregates abruptly by the effect of the reactive component (1202) in the reactive color ink (1203). However, because the black ink 1 (1100) is diffused non-uniformly, the pigment (1101) also aggregates non-uniformly, leading to the presence of the pigment being non-uniformly distributed on the recording medium (1000). In the non-uniform distribution of the pigment, portions at which the layer of the pigment is thin becomes an image looking whitish and empty, in particular. As a result, a non-uniform image looking whitish and empty is obtained.

The conventional image forming method involving applying only the reactive color ink and the black ink 1 so as to overlap to form an image induces the occurrence of color unevenness because the above steps (1) and (2) are repeated to repeatedly form uniform and non-uniform images.

[Mechanism of Image Formation in the Case of the Image Forming Method of the Present Invention]

Figure 3G:
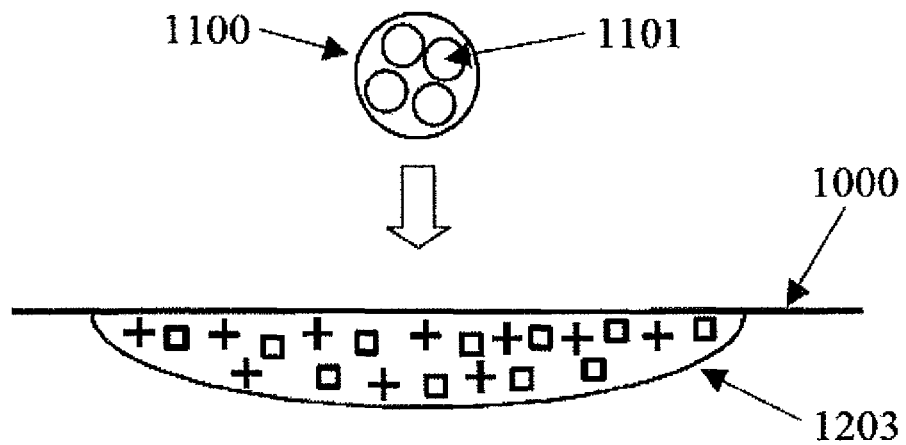
FIGS. 3G, 3H and 3I are conceptual diagrams for the case where inks are applied in the order of reactive color ink, black ink 1, and black ink 2.
Figure 3H:
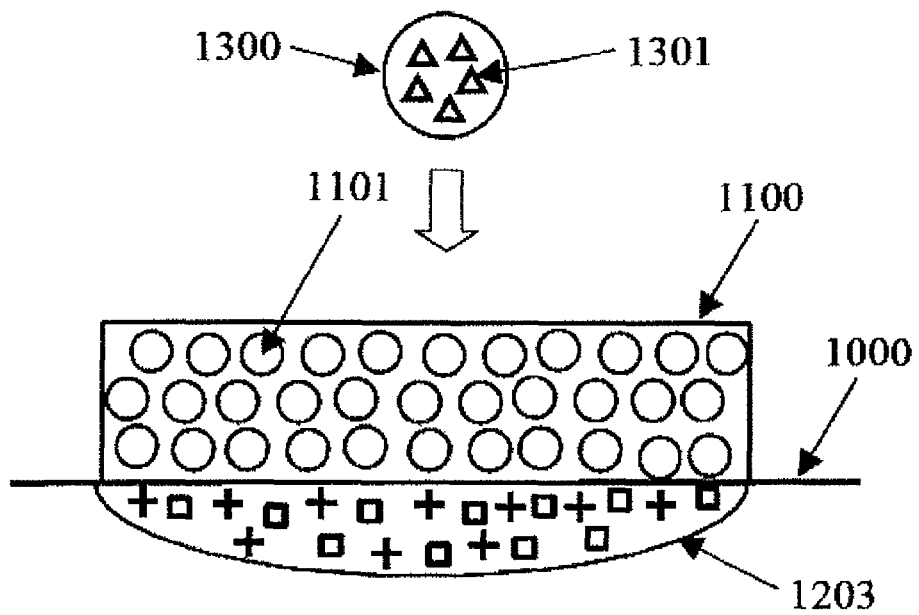
Figure 3I:
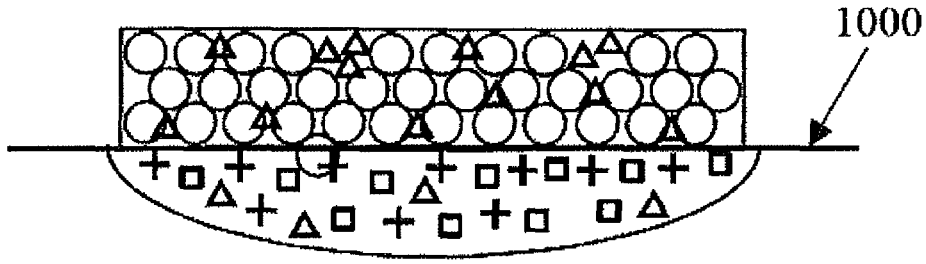
Figure 4J:
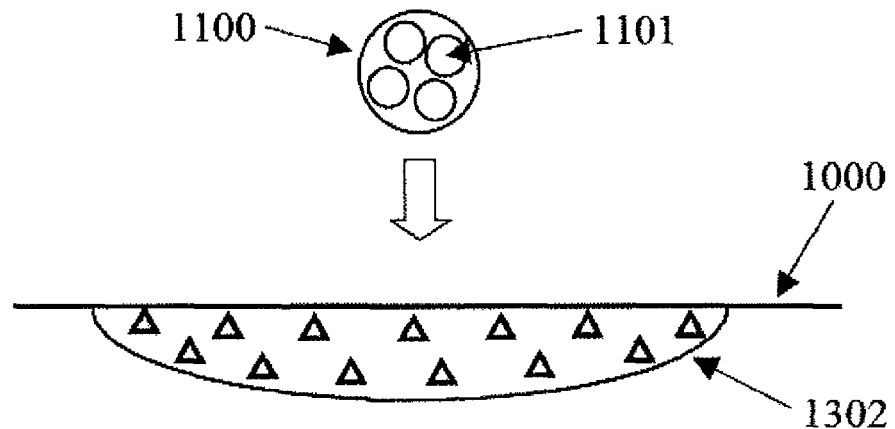
FIGS. 4J, 4K and 4L are conceptual diagrams for the case where inks are applied in the order of black ink 2, black ink 1, and reactive color ink.
Figure 4K:
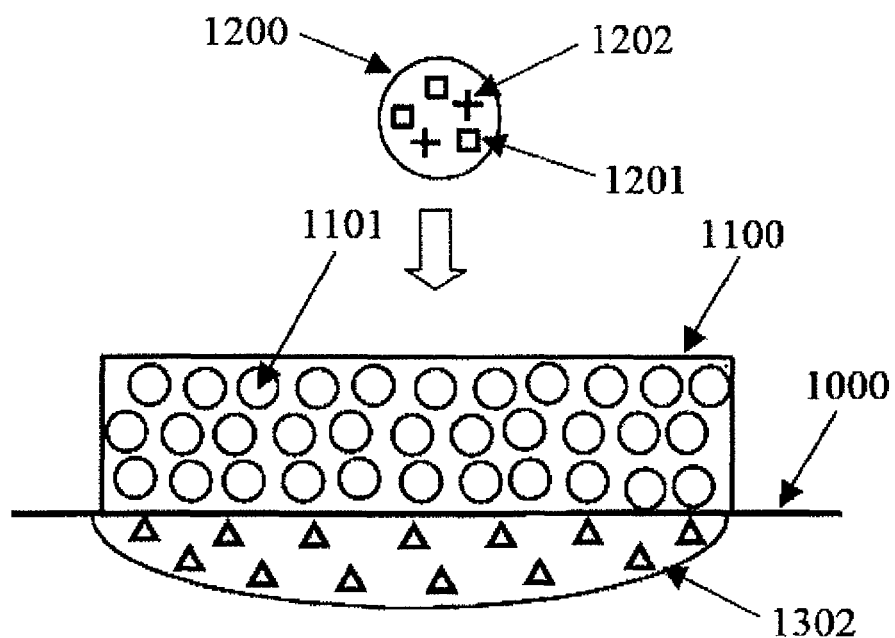
Figure 4L:
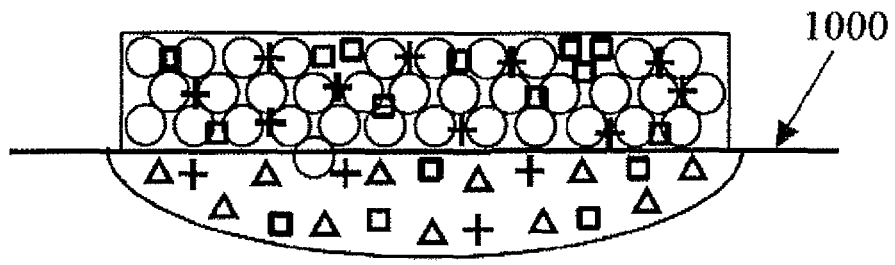

The image forming method of the present invention will now be described with examples. Here as an example, an image forming method of the present invention will be described which involves, in single-pass bi-directional recording, applying a black ink 1, a reactive color ink, and a black ink 2 so as to overlap to form an image. With reference to FIGS. 3G to 3I, a case is first considered in item (3) below where the reactive color ink, black ink 1 and black ink 2 are applied in that order in the forward recording process. With reference to FIGS. 4J to 4L, a case is also considered in item (4) below where the black ink 2, black ink 1 and reactive color ink are applied in that order in the return recording process.

Step of Applying a Reactive Color Ink, a Black Ink 1, and a Black Ink 2 in that Order in the Forward Recording Process FIGS. 3G to 3I are conceptual diagrams for the case where inks are applied in the order of reactive color ink, black ink 1, and black ink 2. First, when a reactive color ink is applied to a recording medium (1000), the reactive color ink, which has such a characteristic that permeation into a recording medium is easy, permeates (1203) into the recording medium (1000), as shown in FIG. 3G. Then, when a black ink 1 (1100) is applied so as to overlap on the reactive color ink, as shown in FIG. 3H, the black ink 1 (1100), which has such a characteristic that permeation into a recording medium is relatively slow, covers the recording medium (1000). Here, the diffusion of the black ink 1 in a layer of the reactive color ink (1203) previously applied to the recording medium tends to proceed slowly and non-uniformly because the black ink 1 permeates relatively less easily into the medium. Simultaneously, the pigment (1101) in the black ink 1 (1100) tends to aggregate abruptly and non-uniformly by the effect of a reactive component (1202) in the reactive color ink (1203). Here, when a black ink 2 (1300) is applied so as to overlap on the black ink 1, the black ink 2, which has such a characteristic that permeation into a recording medium is easy, diffuses quickly and uniformly in a layer of the black ink 1 on the recording medium (1000). This promotes the diffusion of the black ink 1 in a layer of the reactive color ink to make the diffusion uniform, and facilitate the presence of the pigment (1101) to be distributed uniformly on the recording medium (1000). In addition, the black ink 2 also diffuses uniformly in portions being about to look whitish and empty owing to the non-uniform aggregation of the pigment. Thus, a dye (1301) in the black ink 2 is supplemented (staining) to the portions looking whitish and empty to provide a feeling of uniformity. In this manner, a uniform image as illustrated in FIG. 3I is obtained.

Step of Applying the Black Ink 2, Black Ink 1 and Reactive Color Ink in that Order in Return Recording Process FIGS. 4J to 4L are conceptual diagrams for the case where the inks are applied in the order of black ink 2, black ink 1, and reactive color ink. First, when the black ink 2 is applied to the recording medium (1000), the black ink 2, which has such a characteristic that permeation into a recording medium is easy, permeates (1302) into the recording medium (1000), as shown in FIG. 4J. Then, when the black ink 1 (1100) is applied so as to overlap on the black ink 2, as shown in FIG. 4K, the black ink 1 (1100), which has such a characteristic that permeation into a recording medium is relatively slow, covers the recording medium (1000). Here, the diffusion of the black ink 1 in a layer of the black ink 2 (1302) previously applied to the recording medium tends to proceed slowly and non-uniformly because the black ink permeates relatively less easily into the medium. Simultaneously, the pigment (1101) in the black ink 1 (1100) tends to aggregate gradually and non-uniformly. Here, when the reactive color ink (1200) is applied so as to overlap on the black ink 1, the reactive color ink, which has such a characteristic that permeation into a recording medium is relatively easy, diffuses quickly and uniformly in a layer of the black ink 1 on the recording medium (1000). This promotes the diffusion of the black ink 1 in a layer of the black ink 2 to make the diffusion uniform. In addition, the pigment in the black ink 1 is allowed to aggregate abruptly and uniformly by a reactive component (1202) in the reactive color ink to facilitate the presence of the pigment to be distributed uniformly on the surface of the recording medium (1000). In this manner, a uniform image as illustrated in FIG. 4L is obtained.

The image forming method of the present invention involving applying the black ink 1, reactive color ink and black ink 2 so as to overlap to form an image reduces the occurrence of color unevenness because the steps (3) and (4) are repeated and each provide a uniform image.

[Mechanism of Image Formation in the Case of an Image Forming Method not satisfying the Structural Requirements of the Present Invention]

Figure 5M:
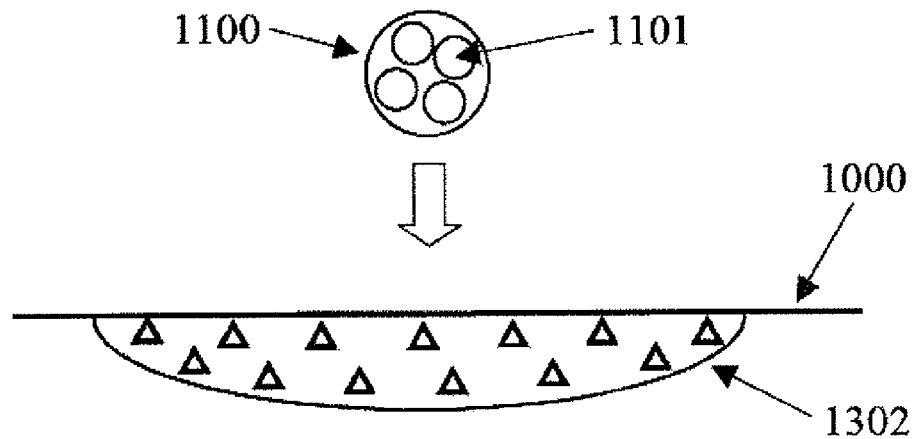
FIGS. 5M, 5N and 5O are conceptual diagrams for the case where inks are applied in the order of black ink 2, black ink 1, and non-reactive color ink.
Figure 5N:
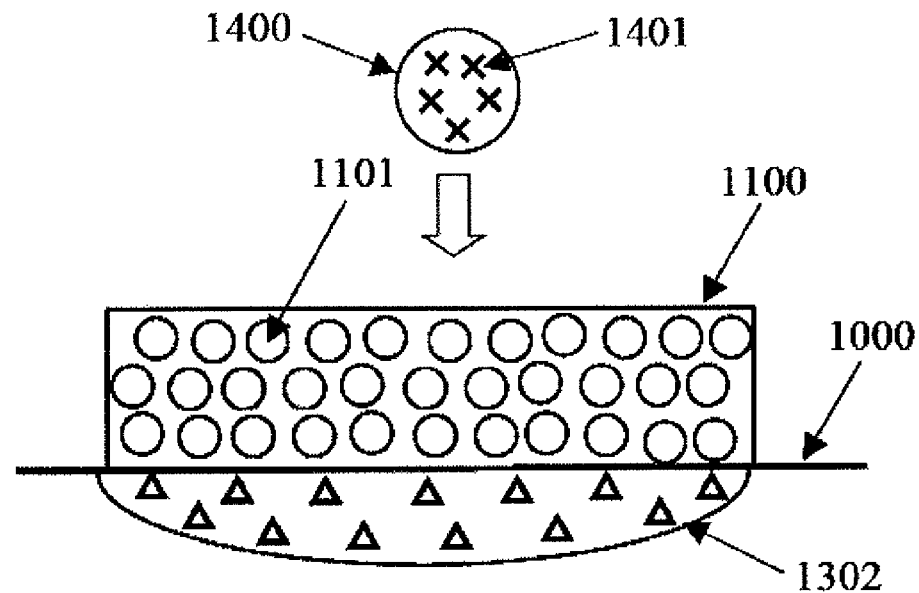
Figure 5O:
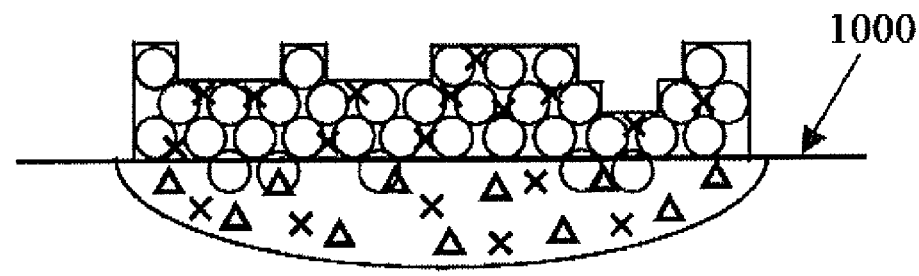

With reference to FIGS. 5M to 5O, a case will be considered where a non-reactive color ink free of a component unstabilizing the dispersion state of a pigment, i.e., a reactive component, is used in place of the reactive color ink according to the present invention. A case will be here described where a black ink 2, a black ink 1, and a non-reactive color ink are applied in that order.

FIGS. 5M to 5O are conceptual diagrams for the case where the inks are applied in the order of black ink 2, black ink 1, and non-reactive color ink. First, when a black ink 2 is applied to a recording medium (1000), the black ink 2, which has such a characteristic that permeation into a recording medium is easy, permeates (1302) into the recording medium (1000), as shown in FIG. 5M. Then, when a black ink 1 (1100) is applied so as to overlap on the black ink 2, as shown in FIG. 5N, the black ink 1 (1100), which has such a characteristic that permeation into a recording medium is relatively slow, covers the recording medium (1000). Here, the diffusion of the black ink 1 in a layer of the black ink 2 (1302) previously applied to the recording medium tends to proceed slowly and non-uniformly because the black ink 1 containing a dye (1401) permeates relatively less easily into the medium. Simultaneously, the pigment (1101) in the black ink 1 (1100) tends to aggregate gradually and non-uniformly. Here, when a non-reactive color ink (1400) is applied so as to overlap on the black ink 1, the aggregation of the pigment is not promoted because the non-reactive ink contains no reactive component. As a result, the pigment diffuses non-uniformly in the recording medium to form a non-uniform image. Color unevenness occurs in this manner.

Figure 6P:
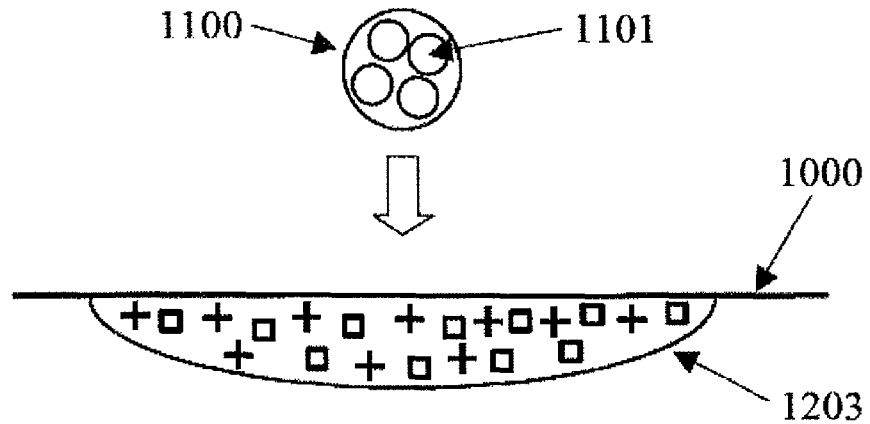
FIGS. 6P, 6Q and 6R are conceptual diagrams for the case where inks are applied in the order of reactive color ink, black ink 1, and a non-reactive yellow ink.
Figure 6Q:
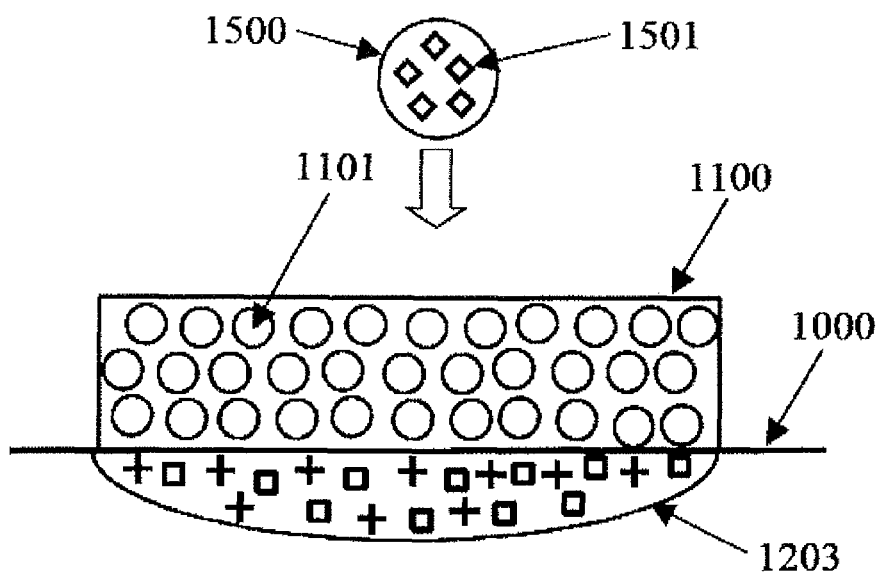
Figure 6R:
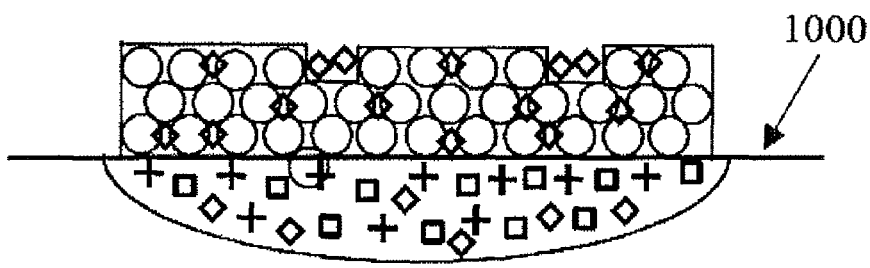

In addition, with reference to FIGS. 6P to 6R, a case will be considered where a yellow ink or a magenta ink is used as a non-reactive color ink in place of the black ink 2 according to the present invention. A case will be here described where the reactive color ink, the black ink 1, and the non-reactive yellow ink are applied in that order. According to the present invention, the hues of the color inks are, off course, not limited thereto.

FIGS. 6P to 6R are conceptual diagrams for the case where the inks are applied in the order of reactive color ink, black ink 1 and non-reactive yellow ink. First, when a reactive color ink is applied to a recording medium (1000), the reactive color ink, which has such a characteristic that permeation into a recording medium is relatively easy, permeates (1203) into the recording medium (1000), as shown in FIG. 6P. Then, when a black ink 1 (1100) is applied so as to overlap on the reactive color ink, as shown in FIG. 6Q, the black ink 1 (1100), which has such a characteristic that permeation into a recording medium is relatively slow, covers the recording medium. Here, the diffusion of the black ink 1 in a layer of the reactive color ink (1203) previously applied to the recording medium tends to proceed slowly and non-uniformly because the black ink 1 permeates relatively less easily into the medium. Simultaneously, the pigment (1101) in the black ink 1 (1100) aggregates abruptly and non-uniformly by the effect of a reactive component (1202) in the reactive color ink, resulting in starting to produce portions looking whitish and empty. Here, a non-reactive yellow ink (1500) containing a dye (1501) is applied so as to overlap on the black ink 1. Then, the non-reactive yellow ink, which has such a characteristic that permeation into a recording medium is relatively easy, diffuses quickly and uniformly in a layer of the black ink 1 on the recording medium. However, when the non-reactive yellow ink diffuses uniformly in portions being about to look whitish and empty owing to the non-uniform aggregation of the pigment, a uniform image cannot be formed because the portions looking whitish and empty cannot be sufficiently supplemented (stained). Color unevenness occurs in this manner.

<Inks>

As for the inks used in the image forming method according to the present invention, a characteristic component constituting each ink and a component for common use in the inks are described below in that order.

[Black Ink 1]

(Coloring Material)

It is essential that the coloring material for the black ink 1 be a pigment. The dispersion form of the pigment in the black ink 1 may be any form such as a self-dispersion form and a polymer-dispersed form using a polymer or the like as a dispersant. These pigments may be used not only singly but also in a mixture of two kinds or more thereof. For the purpose of toning or the like, a dye may be also used in addition to the pigment.

The content (mass %) of the pigment in the black ink 1 is preferably 0.1 mass % or more to 15.0 mass % or less, more preferably 1.0 mass % or more to 10.0 mass % or less based on the total mass of the black ink 1.

[Self Dispersion Pigment]

According to the present invention, a self dispersion pigment is preferably used in which at least one hydrophilic group is bonded directly or via another atomic group (—R—) to the surface of the pigment particle. The use of such a pigment eliminates the need to add a dispersant for dispersing a pigment in the ink, or can reduce the addition amount of a dispersant.

Specific examples of the hydrophilic group bonded to the surface of the pigment particle include —COO($M_1$), —$SO_3$($M_1$), —$PO_3H$($M_1$), —$PO_3$($M_1$)$_2$, and —(COO($M_1$))$_n$, where "$M_1$" is one of a hydrogen atom, an alkali metal, ammonium, and an organic ammonium; and n is an integer of 2 or more. Examples of the atomic group (—R—) include an alkylene group having a carbon number of 1 to 12, a substituted or unsubstituted phenylene group, or a substituted or unsubstituted naphthylene group. The present invention is, of course, not intended to be limited thereto. In addition, the form of the hydrophilic group in the ink may be of a partially or completely dissociated form.

For the present invention, among others, is usable a pigment to whose surface a compound having the above-described structure —R—(COOM$_1$)$_n$ as a part thereof is bonded and which is obtained by a diazo coupling method. The present invention is, off course, not intended to be limited thereto.

Among these pigments, particularly preferred is a self dispersion pigment, to whose surface a —R—(COOM$_1$)$_n$ group is bonded, because the use thereof provides excellent image quality and bleeding resistance. It is probable that the interaction between the self dispersion pigment and a water-soluble organic solvent in an ink is greatly involved for the reason. Specifically, the following phenomenon probably occurs when the —R—(COOM$_1$)$_n$ group is bonded to the surface of a pigment particle, particularly when the —R—(COOM$_1$)$_n$ groups are bonded at high density to the surface thereof.

The presence of the —R—(COOM$_1$)$_n$ group bonded to the surface of the pigment particle in ink to facilitate the occurrence of steric hindrance or the like. This makes less easy for the pigment particle having the —R—(COOM$_1$)$_n$ group bonded thereto to undergo salvation with a water-soluble organic solvent present close thereto than for a conventional self dispersion pigment to undergo salvation with a water-soluble organic solvent present close thereto. As a result, when ink is applied to a recording medium, the separation between an aqueous medium in the ink and a solid content containing the pigment (solid-liquid separation) will be very rapidly induced. The water-soluble organic solvent contained in the ink less easily undergoing salvation with the pigment will reduce an effect of stabilizing the dispersion state of the pigment due to salvation in the ink, resulting in the more marked occurrence of aggregation of pigments on the recording medium.

For the purpose of the present invention, the salvation refers to the affinity between a pigment and a water-soluble organic solvent, and depends on how much region having affinity to the water-soluble organic solvent the pigment has. Examples of the region having affinity to the water-soluble organic solvent include a region to which a hydrophilic group is not bonded, on the surface of the pigment particle. By way of example, when groups having ionicity are bonded at high density to the surface of the pigment particle, it reduces the area of the region which has affinity to the water-soluble organic solvent which is exposed on the surface of a pigment particle. When hydrophilic groups cover the surface of a pigment particle at higher density, the following will happen. Specifically, it is made less easy for the water-soluble organic solvent to undergo salvation with the pigment, by the synergistic effect between steric hindrance due to the hydrophilic groups and a reduction in the region of the pigment having affinity to the water-soluble organic solvent.

In —R— bonded to the surface of the pigment particle, —(COOM$_1$) is preferably bonded to a carbon atom adjacent to a carbon atom to which —(COOM$_1$) is bonded. In addition, it is preferable that the 'n' is 2 and the R is $C_6H_3$. This is because the above-described structure provides an excellent effect on image quality and bleeding resistance. In —R— bonded to the surface of the pigment particle, "—(COOM$_1$) is bonded to a carbon atom next to a carbon atom to which —(COOM$_1$) is bonded" refers to the condition "each of two or more adjacent carbon atoms in R has a —(COOM$_1$) group". This specifically means, for example, having a structure of formula (I) below. According to the present invention, preferably used is a self dispersion pigment in which a group represented by formula (1) below is bonded to the surface of the pigment particle. The present invention is, off course, not intended to be limited thereto.

[Formula 1]

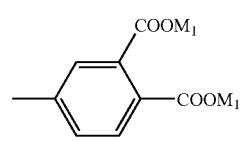

In the black ink 1, the —R—(COOM$_1$)$_n$ groups is preferably bonded at higher density to the surface of the pigment particle. By way of specific example, the density of the hydrophilic groups on the surface of the pigment particle is preferably 2.00 μmol/m$^2$ or more. This is because the solid-liquid separation ascribed to the extent of salvation as described above is more facilitated to more markedly produce the above-mentioned effect. According to the present invention, the density of the hydrophilic groups on the pigment particle is not limited to the above range because it is greatly affected by the specific surface area of the pigment, the structure of functional groups bonded to the surface of the pigment particle, and the like.

In addition, in the black ink 1, a case where the $M_1$ is ammonium is particularly preferable because it provides excellent water resistance. This is probably due to the circumstance that applying the ink to a recording medium induces the decomposition the ammonium to cause evaporation of the ammonia and then the hydrophilic group bonded to the surface of the pigment particle is transferred to the H type (acid type), thereby resulting in reduced hydrophilicity. Here, the self dispersion pigment in which $M_1$ is ammonium can be obtained by the following method. Examples thereof include a method involving subjecting to an ion exchange method a self dispersion pigment in which $M_1$ is an alkali metal to replace $M_1$ with ammonium, and a method involving adding an acid to the self dispersion pigment to make it into the H type, followed by adding ammonium hydroxide thereto to replace $M_1$ with ammonium.

[Polymer Dispersion Pigment]

The black ink 1 may use a dispersant (polymer) for dispersing a pigment in the ink. The dispersant used may any dispersant provided that it has water solubility. According to the present invention, particularly, a dispersant can be used which has a hydrophilic group and is capable of stably dispersing the pigment in an aqueous medium by the effect thereof. The dispersant used preferably has a weight average molecular weight of 1,000 to 30,000, more preferably 3,000 to 15,000. The content (mass %) of the dispersant in the black ink 1 is preferably 0.1 mass % or more to 10.0 mass % or less based on the total mass of the black ink 1. The content ratio of the pigment and the dispersant (P/B ratio) in the black ink 1 is preferably 0.02 or more to 150 or less.

Specific examples of the dispersant which may be used include the following: styrene-acrylic acid copolymer and styrene-acrylic acid-alkylacrylate copolymers; styrene-maleic acid copolymer and styrene-maleic acid-alkylacrylate copolymers; styrene-methacrylic acid copolymer and styrene-methacrylic acid-alkylacrylate copolymers; styrene-maleic acid half ester copolymer; vinylnaphthalene-acrylic acid copolymer, vinylnaphthalene-maleic acid copolymer, and styrene-maleic anhydride-maleic acid half ester copolymer; or salts of these copolymers.

[Carbon Black]

Examples of the pigment used in the black ink include the carbon black. Examples thereof which may be used include furnace black, lampblack, acetylene black, and channel black. Specific examples thereof which may be used include the following commercial products. The present invention is, off course, not intended to be limited thereto.

Raven: 7000, 5750, 5250, 5000 ULTRA, 3500, 2000, 1500, 1250, 1200, 1190 ULTRA-II, 1170, and 1255 (from Columbia). Black Pearls L, Regal: 400R, 330R, and 660R, Mogul L, Monarch: 700, 800, 880, 900, 1000, 1100, 1300, and 1400, and Vulcan XC-72R (from Cabot). Color Black: FW1, FW2, FW2V, FW18, FW200, S150, S160, and S170, Printex: 35, U, V, 140U, and 140V, and Special Black: 6, 5, 4A, and 4 (from Degussa). No. 25, No. 33, No. 40, No. 47, No. 52, No. 900, No. 2300, MCF-88, MA600, MA7, MA8, and MA100 (from Mitsubishi Chemical Corporation).

Carbon blacks specially prepared for the present invention may be also used. A magnetic material fine particles such as magnetite and ferrite, titanium black, or the like may be also used without limiting to carbon black.

(Salt)

The black ink 1 preferably contains a salt. This can afford such a black ink 1 as to avoid large variation of image quality depending on the type of a recording medium and to enable stably obtaining high image density and excellent image quality.

The form of the salt in the black ink 1 may be a partially or completely dissociated form.

Specific examples of the salt which may be used in the black ink 1 include $(M_2)NO_3$, $CH_3COO(M_2)$, $C_6H_5COO(M_2)$, $C_2H_4(COO(M_2))_2$, $C_6H_4(COO(M_2))_2$, and $(M_2)_2SO_4$. In the formulas, "$M_2$" is one of an alkali metal, ammonium, and an organic ammonium. The present invention is, off course, not intended to be limited thereto.

The content of the salt in the black ink 1 may be in the range in which the advantage of the present invention can be sufficiently achieved. Specifically, the content (mass %) of the salt is preferably 0.05 mass % or more to 10.0 mass % or less based on the total mass of the black ink 1.

A case where the $M_2$ is ammonium is more preferable because it provides more excellent water resistance. Among others, particularly preferred are $NH_4NO_3$, $C_2H_4(COONH_4)_2$, $C_6H_4(COONH_4)_2$, $(NH_4)_2SO_4$, and the like because they provide water resistance in a relatively short period of time. A case where the salt is $C_2H_4(COO(M_2))_2$, $C_6H_4(COO(M_2))_2$, or $(M_2)_2SO_4$ is more preferable because they are particularly excellent in the dispersion stability of the pigment even when water in the ink has evaporated during preservation or the like. For a self dispersion pigment in which an —R—$(COOM_1)$ group is bonded to the surface of the pigment particle, for example, when 'n' is 2, a divalent salt can be used as a salt employed in combination with the self dispersion pigment. This, i.e., the case where the valence of functional groups on the surface of the pigment is identical to that of the salt, is particularly preferable because it remarkably provides the advantage of the present invention. Specific examples thereof include a combination of a self dispersion pigment in which an —R—$(COOM_1)_2$ group is bonded to the surface of the pigment particle with a salt of $C_2H_4(COO(M_2))_2$, $C_6H_4(COO(M_2))_2$, or $(M_2)_2SO_4$. The present invention is, off course, not intended to be limited thereto.

[Reactive Color Ink]

The reactive color ink is characterized by unstabilizing the dispersion state of the pigment in the black ink 1. For the purpose of the invention, "unstabilizing the dispersion state of the pigment in the black ink 1" is defined as a case where one of (1) and (2) below is satisfied. The reactive color ink and the black ink 1 are first mixed together in equal volumes to prepare a mixed ink. Here, are mentioned (1) a mode in which precipitates or aggregates of the pigment are generated in the mixed ink, and (2) a mode in which viscosity A of the reactive color ink, viscosity B of the black ink 1 and viscosity C of the mixed ink satisfy the relationship $C>((A+B)/2)\times 1.2$. In this respect, the viscosities are values measured at ordinary temperature (25° C.) and are expressed in units of mN/m. The above modes (1) or (2) may be specifically obtained, for example, by the following (I), (II), or (III).

(I) A mode in which the pigment in the black ink 1 has an anionic group and the reactive color ink has a cationic component as a reactive component. In this case, mixing the black ink 1 with the reactive color ink induces the reaction of a cationic component in the color ink with an anionic group of the pigment in the black ink 1. As a result, the dispersion state of the pigment is unstabilized to cause the dispersion-breakdown and aggregation of the pigment and to thicken the mixed ink. As the cationic component, there may be used, for example, a polyvalent metal salt. In this respect, the polyvalent metal salt is present being dissociated into a polyvalent metal ion and one or more anion in the ink, which case is also described with the expression that the ink contains a polyvalent metal salt. Specific measures for allowing an ink to contain a polyvalent metal include allowing the ink to contain a polyvalent metal salt. Preferred specific examples of the polyvalent metal ion are $Mg^{2+}$, $Ca^{2+}$, $Cu^{2+}$, $CO^{2+}$, $Ni^{2+}$, $Fe^{2+}$, $La^{3+}$, $Nd^{3+}$, $Y^{3+}$, and $Al^{3+}$. Preferred specific examples of the anion are $NO_3^-$, $SO_4^{2-}$, and $Cl^-$. According to the present invention, among the above-described polyvalent metal ions, $Mg^{2+}$ is particularly preferably used in view of the preservation stability of the reactive ink and of not dissolving members contacting the reactive ink (an ink passage and the like constituting an ink jet recording apparatus). Among the above-described anions, $NO_3^-$, $SO_4^{2-}$, and $Cl^-$ are preferably used in view of solubility; $NO_3^-$ is particularly preferably used because it is excellent in solubility in water. The content (mass %) of the polyvalent metal in the reactive color ink is preferably 0.01 mass % or more to 10 mass % or less based on the total mass of the reactive color ink; that of the polyvalent metal salt is preferably 0.1 mass % or more to 15.0 mass % or less.

According to the present invention, the reactive color ink preferably has a chroma of 40 or more in the CIELab color space as determined for a liquid obtained by diluting the reactive color ink by 2,000 times in mass with water. This is because setting the lightness in this manner particularly remarkably achieves the advantage of the present invention that even the use of various plain papers as recording media induces no great variation of image quality depending on the type of recording media and reduces the occurrence of bleeding and color unevenness.

Coloring materials which may be used in the reactive color ink are enumerated below by color tone. The present invention is, off course, not intended to be limited thereto.

[Yellow Coloring Material]

C.I. Direct Yellows: 8, 11, 12, 27, 28, 33, 39, 44, 50, 58, 85, 86, 87, 88, 89, 98, 100, 110, 132, etc.

C.I. Acid Yellows: 1, 3, 7, 11, 17, 23, 25, 29, 36, 38, 40, 42, 44, 76, 98, 99, etc.

C.I. Reactive Yellows: 2, 3, 17, 25, 37, 4, etc.

C.I. Food Yellows: 3, etc.

A compound represented by general formula (I) below:

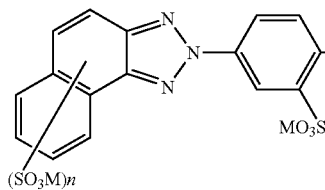
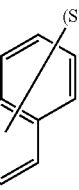

General Formula (I)

(II) A mode in which the pigment in the black ink 1 has a cationic group and the reactive color ink has an anionic component as a reactive component. In this case, mixing the black ink 1 with the reactive color ink induces the reaction of an anionic component in the reactive color ink with a cationic group of the pigment in the black ink 1. As a result, the dispersion state of the pigment is unstabilized to cause the dispersion-breakdown and aggregation of the pigment and to thicken the mixed ink.

(III) A mode in which the pigment in the black ink 1 is a pigment capable of being stably dispersed at $pH_A$ and the reactive color ink is at $pH_B$, and then the pHs of the respective inks are adjusted such that the mixed ink of the black 1 and the reactive color ink has $pH_C$. In this case, mixing the black ink 1 with the reactive color ink changes the pH of the black ink 1. As a result, the dispersion state of the pigment in the black ink 1 is unstabilized to cause the dispersion-breakdown and aggregation of the pigment and to thicken the mixed ink. Here, the $pH_A$ is in the range in which the pigment is stably dispersed, and the $pH_C$ is in the range in which the pigment is unstably dispersed.

(Coloring Material)

The coloring material for the reactive color ink used may be a known or newly synthesized coloring material selected properly. The content (mass %) of the coloring material in the reactive color ink is preferably 0.05 mass % or more to 15.0 mass % or less based on the total mass of the color ink.

(wherein M's each independently represent a hydrogen atom, an alkali metal, an alkali earth metal, a cation of an organic amine, or an ammonium ion; n's each independently represent 1 or 2.)

In the above general formula (I), M's each independently represent one of a hydrogen atom, an alkali metal, an alkali earth metal, a cation of an organic amine, or an ammonium ion. Specific examples of the alkali metal include sodium, potassium, and lithium. Specific examples of the alkali earth metal include calcium and magnesium. Specific examples of the organic amine include methylamine, ethylamine, monoethanolamine, diethanolamine, triethanolamine, monoisopropanolamine, and diisopropanolamine. According to the present invention, M is preferably a hydrogen atom, an alkali metal such as sodium, potassium, and lithium, ammonium ion, or an alkanolamine ion such as monoethanolamine ion, diethanolamine ion, and triethanolamine ion.

Specific examples of compounds represented by general formula (I) above include compounds having structures as shown in the following table. The present invention is, off course, not intended to be limited thereto. In Table 1, the substitution positions of sulfone groups are given, for convenience, as positions on the rings A and B as shown in general formula (II) below. The substitution positions of sulfone groups are defined as shown in general formula (II) below.

TABLE 1

General Formula (II)

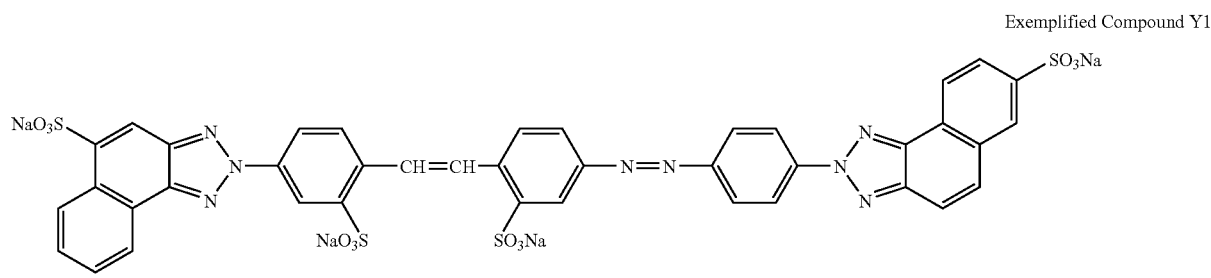

| | Positions of substituents | |
|---|---|---|
| Exemplified compounds | Ring A | Ring B |
| Y1 | 2 | 4 |
| Y2 | 4 | 4 |
| Y3 | 2 | 4,6 |
| Y4 | 4, 6 | 4 |

Preferred specific examples of compounds represented by the above general formula (I) include the following exemplified compound Y1. The present invention is, off course, not intended to be limited thereto.

C.I. Acid Reds: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.

C.I. Food Reds: 87, 92, 94, etc.

Exemplified Compound Y1

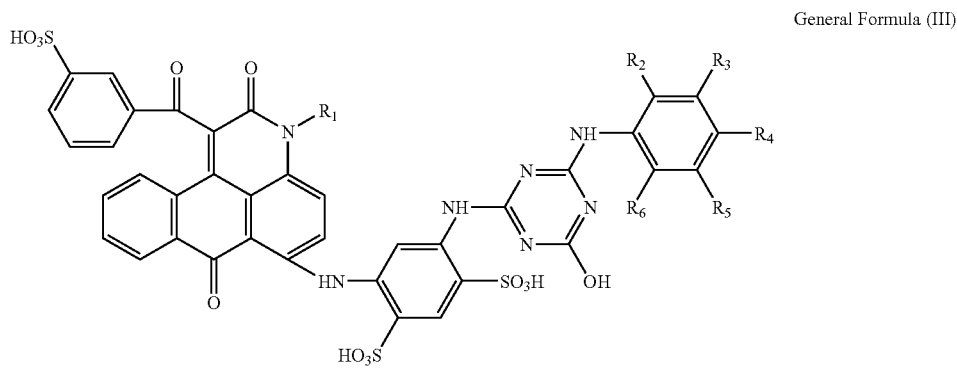

[Magenta Coloring Material]

C.I. Direct Reds: 2, 4, 9, 11, 20, 23, 24, 31, 39, 46, 62, 75, 79, 80, 83, 89, 95, 197, 201, 218, 220, 224, 225, 226, 227, 228, 229, 230, etc.

C.I. Direct Violets: 107, etc.

A compound represented by general formula (III) below or a salt thereof:

General Formula (III)

(wherein $R_1$ represents a hydrogen atom, an alkyl group, a hydroxyalkyl group, a cyclohexyl group, a mono- or di-alkylamino group, or a cyanoalkyl group; $R_2$, $R_3$, $R_4$, $R_5$, and $R_6$ each independently represent a hydrogen atom, an alkyl group having a carbon number of 1 to 8, or a carboxyl groups with the proviso that the case where all of $R_2$, $R_3$, $R_4$, $R_5$, and $R_6$ are a hydrogen atom is excluded.)

The following exemplified compounds M1 to M7 are preferred exemplified compounds of compounds represented by the above general formula (III) or salts thereof. The present invention is, off course, not intended to be limited thereto. In this respect, all of solubilizing groups in the following exemplified compounds M1 to M7 are described as H-type, but optionally form salts.

Exemplified Compound M1

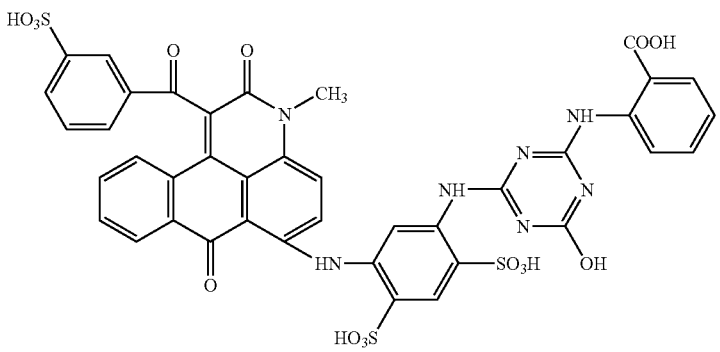

Exemplified Compound M2

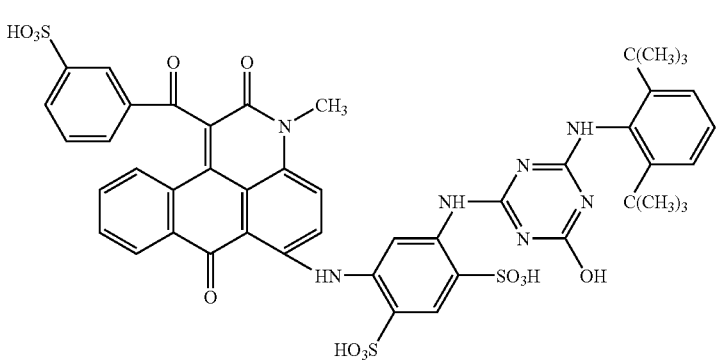

Exemplified Compound M3

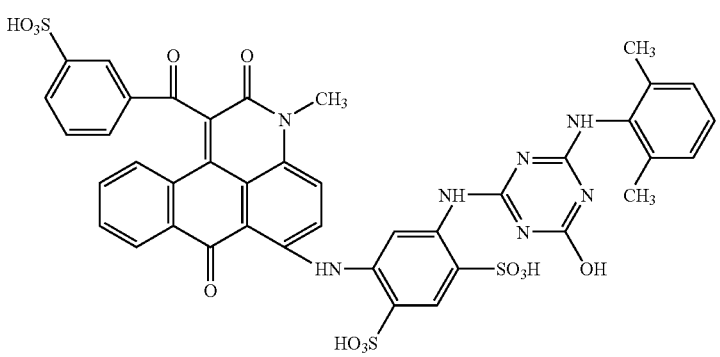

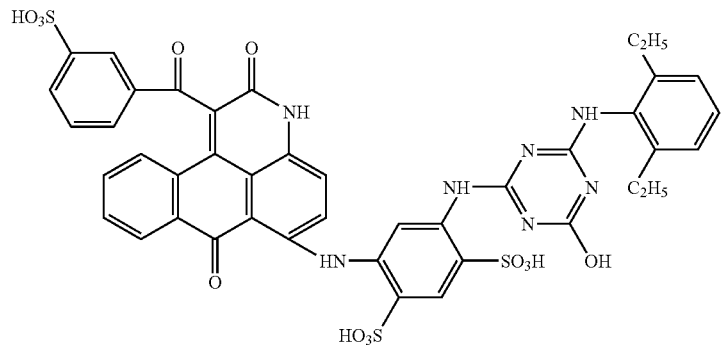
Exemplified Compound M4
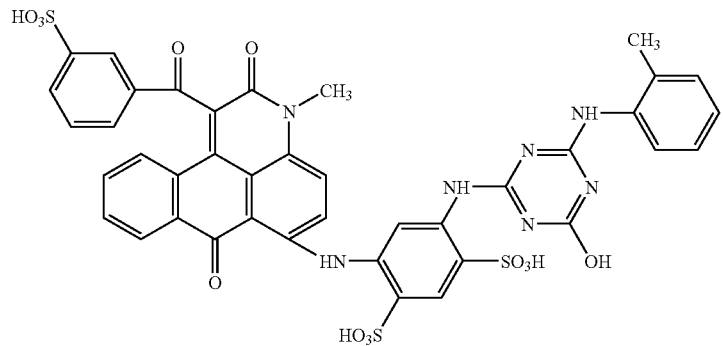
Exemplified Compound M5
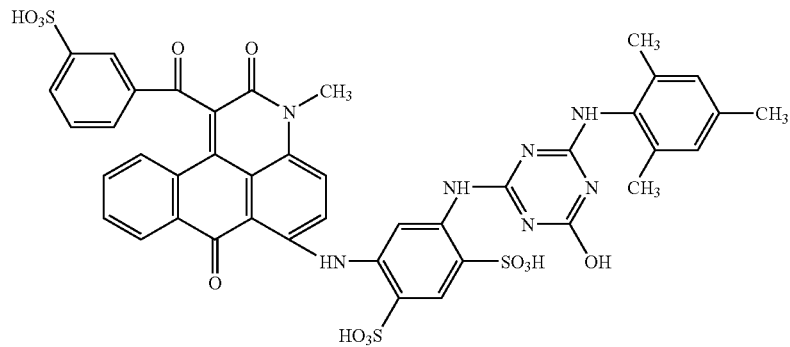
Exemplified Compound M6

-continued

Exemplified Compound M7

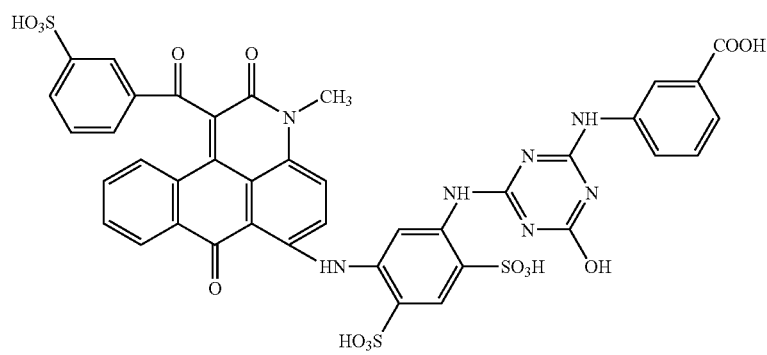

Specific examples of compounds represented by the above general formula (III) or salts thereof include the following exemplified compound M1 (sodium salt) which is the sodium salt of the exemplified compound M1.

Exemplified Compound M1

(sodium salt)

[Cyan Coloring Material]

C.I. Direct Blues: 1, 15, 22, 25, 41, 76, 77, 80, 86, 90, 98, 106, 108, 120, 158, 163, 168, 199, 226, 307, etc.

C.I. Acid Blues: 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.

A compound represented by general formula (IV) below:

(wherein M represents an alkali metal and ammonium; $R_1$ and $R_2$ each independently represent a hydrogen atom, a sulfonic group, or a carboxyl group with the proviso that the case where $R_1$ and $R_2$ are simultaneously a hydrogen atom is excluded; Y represents a chlorine atom, a hydroxyl group, an amino group, or a mono- or di-alkylamino group; l, m, and n each represent l=0 to 2, m=1 to 3, and n=1 to 3, respectively with the proviso that l+m+n=3 to 4; and substitution positions of the substituents are the 4- or 4'-position.)

In the above general formula (IV), M is one of an alkali metal and ammonium. Specific examples of the alkali metal include sodium, potassium, and lithium.

The above coloring material is a phthalocyanine derivative obtained by the selective introduction of one of an unsubstituted sulfamoyl group (—$SO_2NH_2$) and a substituted sulfamoyl group (a group represented by general formula (V)) only into the 4- and 4'-positions in the general formula (IV). For the synthesis of a compound represented by the general formula (IV), is used as a raw material a phthalocyanine compound obtained by reacting a 4-sulfophthalic acid derivative or a 4-sulfophthalic acid derivative and an (anhydrous) phthalic acid derivative in the presence of a metal compound. A sulfonic acid group in the phthalocyanine compound is further converted to a chlorosulfonic acid group, which is then reacted with an aminating agent in the presence of an organic amine to provide a compound of formula (IV).

General Formula (IV)

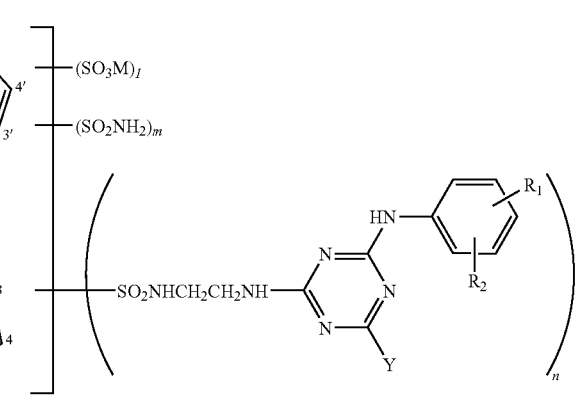

General Formula (V)

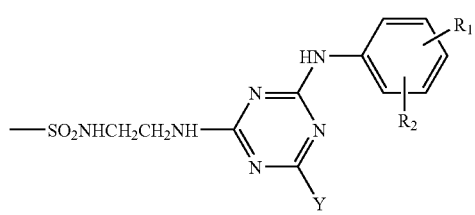

Preferred specific examples of substituted sulfamoyl groups represented by general formula (V) are illustrated below. The present invention, however, is not intended to be limited thereto. In this respect, the substituted sulfamoyl groups represented by the general formula (IV) are shown in the form of free acids.

Exemplified Substituent 1

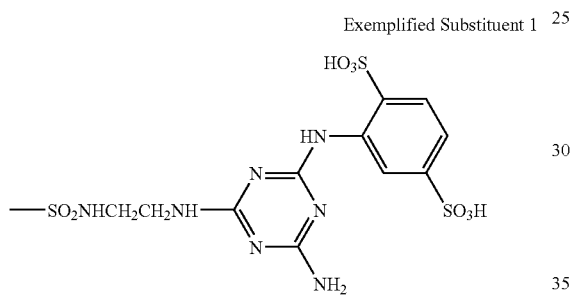

Exemplified Substituent 2

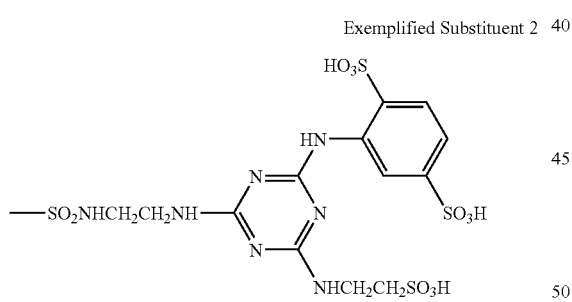

Exemplified Substituent 3

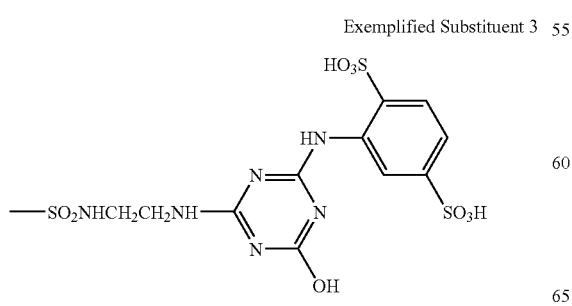

-continued

Exemplified Substituent 4

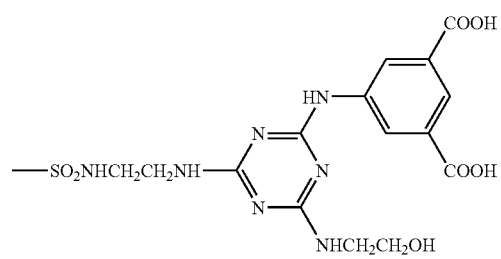

Exemplified Substituent 5

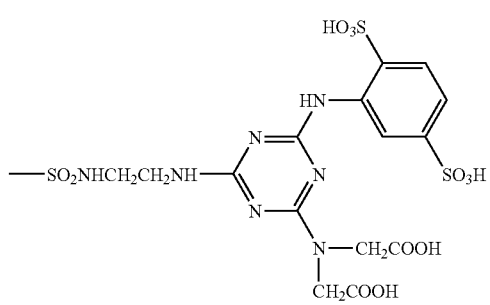

Exemplified Substituent 6

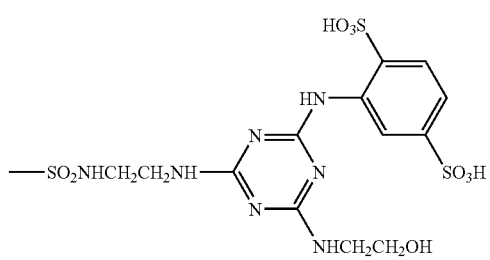

Exemplified Substituent 7

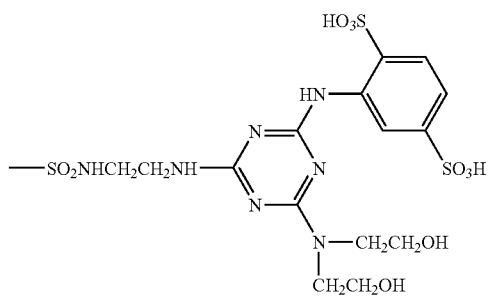

Preferred specific examples of compounds represented by general formula (V) include a compound substituted by the above exemplified substituent 1, i.e., the following exemplified compound C1, in view of the balance between the color developing property and environmental gas resistance thereof. The present invention is, off course, not intended to be limited thereto.

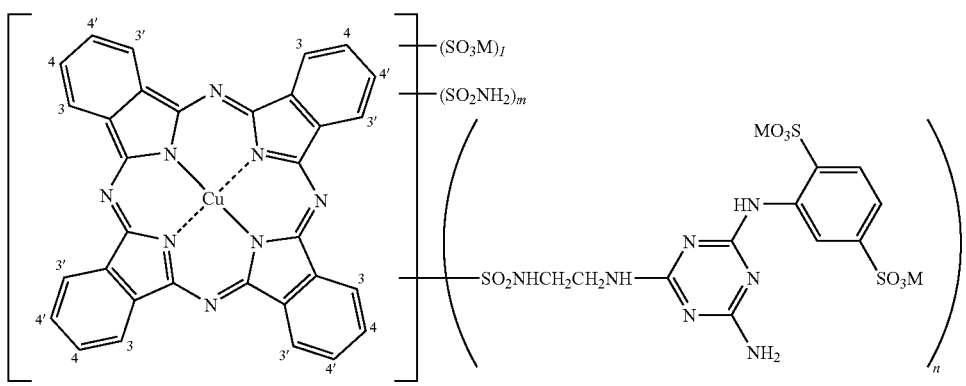

Exemplified Compound C1

[Other Coloring Material]

In the present invention, so-called special color inks such as red, green and blue inks may be used, if necessary, in addition to the above-described inks. Specific examples of coloring materials which may be used in these inks are enumerated below. The present invention is, off course, not intended to be limited thereto.

C.I. Acid Oranges: 7, 8, 10, 12, 24, 33, 56, 67, 74, 88, 94, 116, 142, etc.

C.I. Acid Reds: 111, 114, 266, 374, etc.

C.I. Direct Oranges: 26, 29, 34, 39, 57, 102, 118, etc.

C.I. Food Oranges: 3, etc.

C.I. Reactive Oranges: 1, 4, 5, 7, 12, 13, 14, 15, 16, 20, 29, 30, 84, 107, etc.

C.I. Disperse Oranges: 1, 3, 11, 13, 20, 25, 29, 30, 31, 32, 47, 55, 56, etc.

C.I. Acid Greens: 1, 3, 5, 6, 9, 12, 15, 16, 19, 21, 25, 28, 81, 84, etc.

C.I. Direct Greens: 26, 59, 67, etc.

C.I. Food Greens: 3, etc.

C.I. Reactive Greens: 5, 6, 12, 19, 21, etc.

C.I. Disperse Greens: 6, 9, etc.

C.I. Acid Blues: 62, 80, 83, 90, 104, 112, 113, 142, 203, 204, 221, 244, etc.

C.I. Reactive Blues: 49, etc.

C.I. Acid Violets: 17, 19, 48, 49, 54, 129, etc.

C.I. Direct Violets: 9, 35, 47, 51, 66, 93, 95, 99, etc.

C.I. Reactive Violets: 1, 2, 4, 5, 6, 8, 9, 22, 34, 36, etc.

C.I. Disperse Violets: 1, 4, 8, 23, 26, 28, 31, 33, 35, 38, 48, 56, etc.

[Black Ink 2]

(Coloring Material)

It is essential that the coloring material for the black ink 2 be a dye. The dye used may be a known or newly synthesized dye selected properly. The content (mass %) of the coloring material in the black ink 2 is preferably 0.05 mass % or more to 15.0 mass % or less based on the total mass of the black ink 2.

According to the present invention, the black ink 2 preferably has a lightness L of 55 or less in the CIELab color space as determined for a liquid obtained by diluting the black ink 2 by 2,000 times in mass with water. This is because setting the lightness particularly remarkably achieve the advantage of the present invention that even the use of various plain papers as recording media induces no great variation of image quality depending on the type of recording media and reduces the occurrence of bleeding and color unevenness.

Coloring materials which may be used in the black ink 2 are enumerated below. The present invention is, off course, not intended to be limited thereto.

C.I. Direct Blacks: 17, 19, 22, 31, 32, 51, 62, 71, 74, 112, 113, 154, 168, 195, etc.

C.I. Acid Blacks: 2, 48, 51, 52, 110, 115, 156, etc.

C.I. Food Blacks: 1, 2, etc.

A compound represented by general formula (VI) below or a salt thereof:

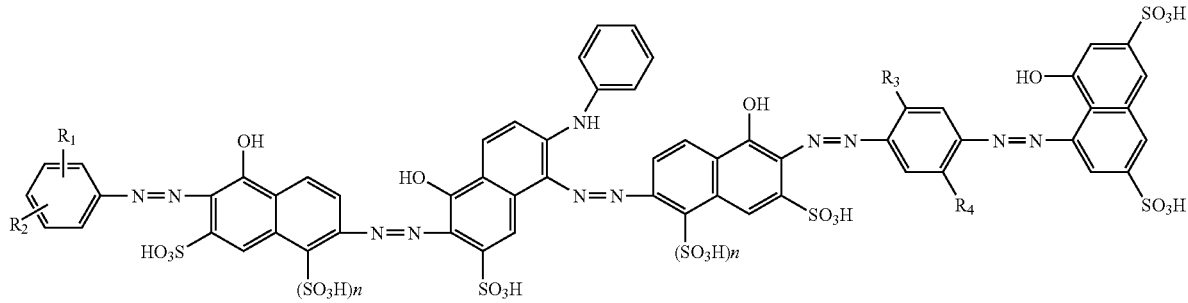

General Formula (VI)

(wherein $R_1$ and $R_2$ each independently represent a hydrogen atom, a hydroxyl group, an amino group, a carboxyl group, a sulfonic acid group, an alkyl group having a carbon number of 1 to 4, or an alkoxy group having a carbon number of 1 to 4; $R_3$ and $R_4$ each independently represent a hydrogen atom, an alkyl group having a carbon number of 1 to 4, an alkoxy group having a carbon number of 1 to 4, a hydroxyl group, an alkyl group having a carbon number of 1 to 4 which may be substituted by one of a hydroxyl group and an alkoxy group having a carbon number of 1 to 4, an alkoxy group having a carbon number of 1 to 4 which may be substituted by one of a hydroxyl group, an alkoxy group having a carbon number of 1 to 4, a sulfonic acid group and a carboxyl group, or an amino group substituted by one of an alkyl group and an acyl group; and n represents 0 or 1.) In this respect, "n=0" in the general formula (VI) refers to "the position of $SO_3H$ is H".

A compound represented by general formula (VII) below or a salt thereof:

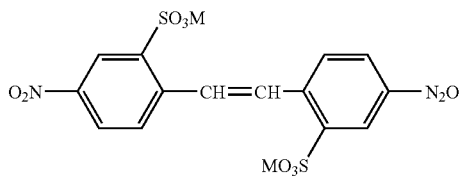

General Formula (VIII)

(wherein M represents a hydrogen atom or an alkali metal atom)

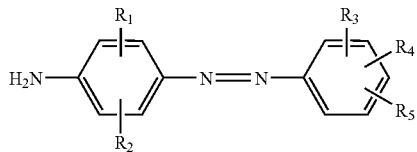

General Formula (IX)

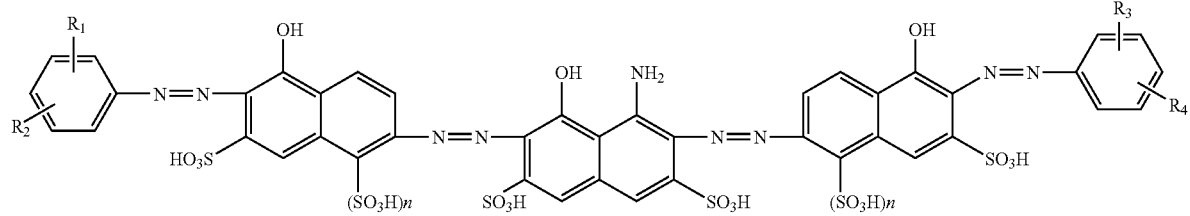

General Formula (VII)

(wherein $R_1$, $R_2$, $R_3$, and $R_4$ each independently represent a hydrogen atom, a hydroxyl group, an amino group, a carboxyl group, a sulfonic acid group, an alkyl group having a carbon number of 1 to 4, an alkoxy group having a carbon number of 1 to 4, a hydroxyl group, an alkoxy group substituted by one of an alkoxy group having a carbon number of 1 to 4, a sulfonic acid group and a carboxyl group, an alkoxy group having a carbon number of 1 to 4 which may be further substituted by one of a carboxyl group and a sulfonic acid group, or an amino group substituted by one of a phenyl group, an alkyl group and an acyl group; and n represents 0 or 1). In this respect, "n=0" in the general formula (VII) refers to "the position of $SO_3H$ is H".

A condensation dye of a 4,4'-dinitrostilbene-2,2'-disulfonate represented by general formula (VIII) below and a compound represented by general formula (IX) below, or a dye obtained by the reduction of the condensation dye (wherein the counter ion of the condensed or reduced dye is one of a hydrogen ion, an alkali metal ion, a cation of an organic amine, and an ammonium ion), or a salt thereof (wherein $R_1$, $R_2$, $R_3$, $R_4$, and $R_5$ each independently represent a hydrogen atom, a halogen atom, a hydroxyl group, a sulfone group, a carboxyl group, an alkyl group having a carbon number of 1 to 4, or an alkoxy group having a carbon number of 1 to 4).

Exemplified compounds Bk1 to Bk3 are illustrated as specific examples of compounds represented by the general formula (VI) or salts thereof, and exemplified compounds Bk4 to Bk6 are illustrated as specific examples of compounds represented by the general formula (VII) or salts thereof. In this respect, the exemplified compounds Bk1 to Bk3 are shown in the form of free acids. According to the present invention, it is particularly preferable that the compound represented by the general formula (IV) or a salt thereof is the exemplified compound 3 and that the compound represented by the general formula (VII) or a salt thereof is the exemplified compound 4. Two or more coloring materials may be used simultaneously; according to the present invention, the exemplified compounds Bk3 and Bk4 are particularly preferably used in combination. In addition, the condensation dye of compounds of the general formulas (VIII) and (IX) is particularly preferably C.I. Direct Orange 39. The present invention is, off course, not intended to be limited thereto.

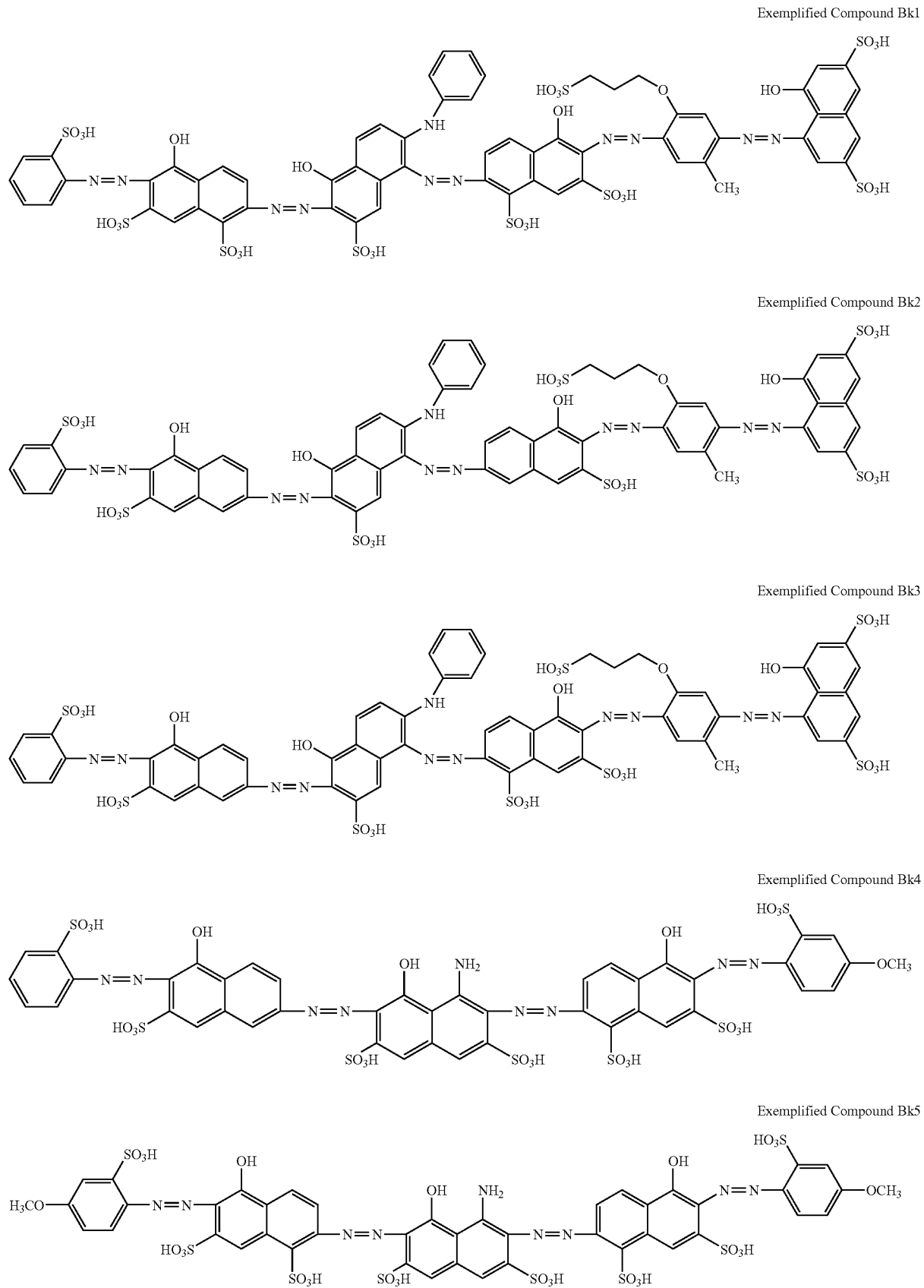

Exemplified Compound Bk6

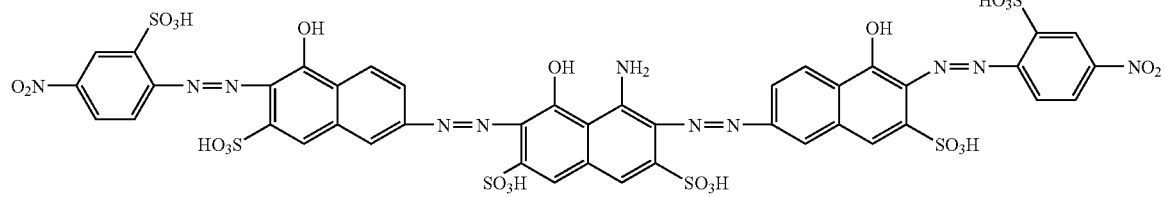

[Non-Reactive Color Ink]

According to the present invention, other inks may be used in combination in addition to the above-described reactive color ink and black inks. For the purpose of the invention, the term "other inks" includes, for example, an ink containing no polyvalent metal or the like, i.e., not reacting with a pigment ink (a non-reactive color ink). The coloring material for the non-reactive color ink used may be a known or newly synthesized coloring material selected properly. By way of specific example, coloring materials which may be used as those for the above-described reactive color ink may be employed. The present invention is, of course, not intended to be limited thereto. The content (mass %) of the coloring material in the non-reactive color ink is preferably 0.05 mass % or more to 15.0 mass % or less based on the total mass of the ink.

[Aqueous Medium for the Ink]

Water or an aqueous medium which is a mixed solvent of water and a water-soluble organic solvent is preferably used in the above-described black ink 1, reactive color ink, black ink 2 and non-reactive color ink. It is preferable that the water used is not general water containing various ions but deionized water.

Specific examples of the water-soluble organic solvent which may be used are as follows. The following water-soluble organic solvents may be used alone or in a mixture. Alkyl alcohols having a carbon number of 1 to 6, such as methyl alcohol, ethyl alcohol, n-propyl alcohol, isopropyl alcohol, n-butyl alcohol, sec-butyl alcohol, and tert-butyl alcohol. Amides such as dimethylformamide and dimethylacetamide. Ketones or ketoalcohols such as acetone and diacetone alcohol. Ethers such as tetrahydrofuran and dioxane. Polyalkylene glycols such as polyethylene glycol and polypropylene glycol. Alkylene glycols whose alkylene groups have a carbon number of 2 to 6, such as ethylene glycol, propylene glycol, butylenes glycol, triethylene glycol, 1,2,6-hexanetriol, thiodiglycol, hexylene glycol, and diethylene glycol. Alkyl ether acetates such as polyethylene glycol monomethyl ether acetate. Glycerin. Alkyl ethers of polyhydric alcohols such as ethylene glycol mono-methyl (or -ethyl) ether, diethylene glycol methyl (or ethyl) ether, and triethylene glycol mono-methyl (or -ethyl) ether. N-methyl-2-pyrrolidone, 2-pyrrolidone, 1,3-dimethyl-2-imidazolidinone, and the like.

The content (mass %) of the water-soluble organic solvent in each ink is preferably 1.0 mass % or more to 50.0 mass % or less, more preferably 3.0 mass % or more to 40.0 mass % or less based on the total mass of the ink. The upper limit of the content of water in each ink is preferably 78.0 mass % or less based on the total mass of the ink. This is because, when the upper limit of the content of water exceeds 78.0 mass %, so-called cockling in which wrinkles are generated on a recording medium may occur after the ink has been applied to the recording medium. In this case, a position to which the ink is applied may be shifted from a desired position or bleeding may occur, so that the advantage of the present invention may not be sufficiently obtained. The lower limit of the content of water in each ink is preferably set to 50.0 mass % or more based on the total mass of the ink.

[Other Component]

In each ink, a moisture-retaining compound such as urea, a urea derivative, trimethylolpropane, and trimethylolethane may be used for maintaining moisture in addition to the above-described components. The content (mass %) of the moisture-retaining compound is preferably 0.1 mass % or more to 20.0 mass % or less, more preferably 3.0 mass % or more to 10.0 mass % or less based on the total mass of the ink.

In addition, various compounds may be contained, if necessary, in each ink to make the ink having desired physical properties in addition to the above-described components. By way of specific example, various additives may be contained such as a surfactant, a pH adjuster, a corrosion inhibitor, a preservative, a fungicide, an antioxidant, a reduction inhibitor, an evaporation accelerator, a chelating agent, and a water-soluble polymer.

For example, at least one surfactant such as the following anionic surfactant or nonionic surfactant may be used by proper selection. Examples of the anionic surfactant include fatty acid salts, higher alcohol sulfate ester salts, fatty oil sulfate ester salts, and alkylallylsulfonates. Examples of the nonionic surfactant include polyoxyethylene alkyl ethers, polyoxyethylene alkyl esters, polyoxyethylene sorbitan alkyl esters, acetylenic alcohols, and acetylene glycols. Among the above, acetylenic alcohols and acetylene glycols are particularly preferable because they exert an excellent effect on permeability into plain papers.

To achieve sharp character quality and high image density, the black ink 1 is preferably a so-called overlying-type ink, which is relatively low in permeability into a recording medium. Specifically, the black ink preferably has a surface tension of 30 mN/m or more to 50 mN/m or less. To suppress bleeding, the reactive color ink and black ink 2 are each preferably a so-called permeating-type ink, which is relatively high in permeability into a recording medium. Specifically, the reactive color ink and the black ink 2 preferably have a surface tension of 20 mN/m or more to 40 mN/m or less. Further, to achieve the advantage of the present invention, the surface tension of the black ink 1 is particularly preferably adjusted to provide a surface tension higher than those of the reactive color ink and the black ink 2.

(Image Forming Apparatus)

The image forming apparatus or ink jet recording apparatus according to the present invention is an image forming apparatus or ink jet recording apparatus using a black ink 1 containing a pigment, a black ink 2 containing a dye, and a reactive color ink capable of unstabilizing the dispersion state of the pigment in the black ink 1, wherein the apparatus includes either one of a unit for, on at least part of a region to which the black ink 1 is to be applied, applying the reactive color ink, the black ink 1, and the black ink 2 in that order so as to overlap, thereby applying these inks to a recording medium; and a unit for, on at least part of a region to which the black ink 1 is to be applied, applying the black ink 2, the black ink 1, and the reactive color ink in that order so as to overlap, thereby applying these inks to a recording medium.

The image forming apparatus or ink jet recording apparatus according to the present invention is particularly preferably an image forming apparatus or ink jet recording apparatus having a unit for forming an image by bi-directional recording and using a black ink 1 containing a pigment, a black ink 2 containing a dye, and a reactive color ink capable of unstabilizing the dispersion state of the pigment in the black ink 1, wherein the apparatus includes at least a unit 1 for, on at least part of a region to which the black ink 1 is to be applied, applying the reactive color ink, the black ink 1, and the black ink 2 in that order so as to overlap, thereby applying these inks to the recording medium; and a unit 2 for, on at least part of a region to which the black ink 1 is to be applied, applying the black ink 2, the black ink 1, and the reactive color ink in that order so as to overlap, thereby applying these inks to the recording medium, and wherein the forward recording process of the bi-directional recording uses one of the units 1 and 2 and the return recording process of the bi-directional recording uses the other unit.

Figure 7:
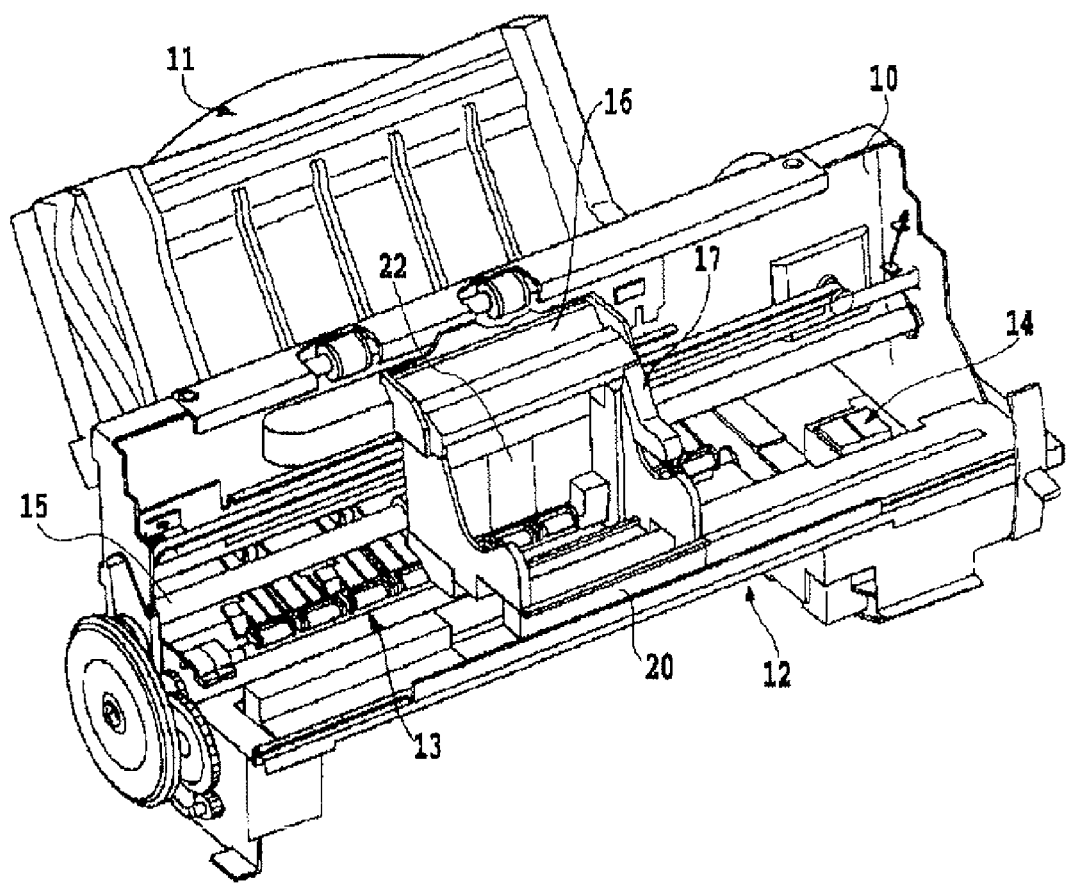
FIG. 7 is a schematic drawing illustrating an example of an ink jet recording apparatus.
Figure 8:
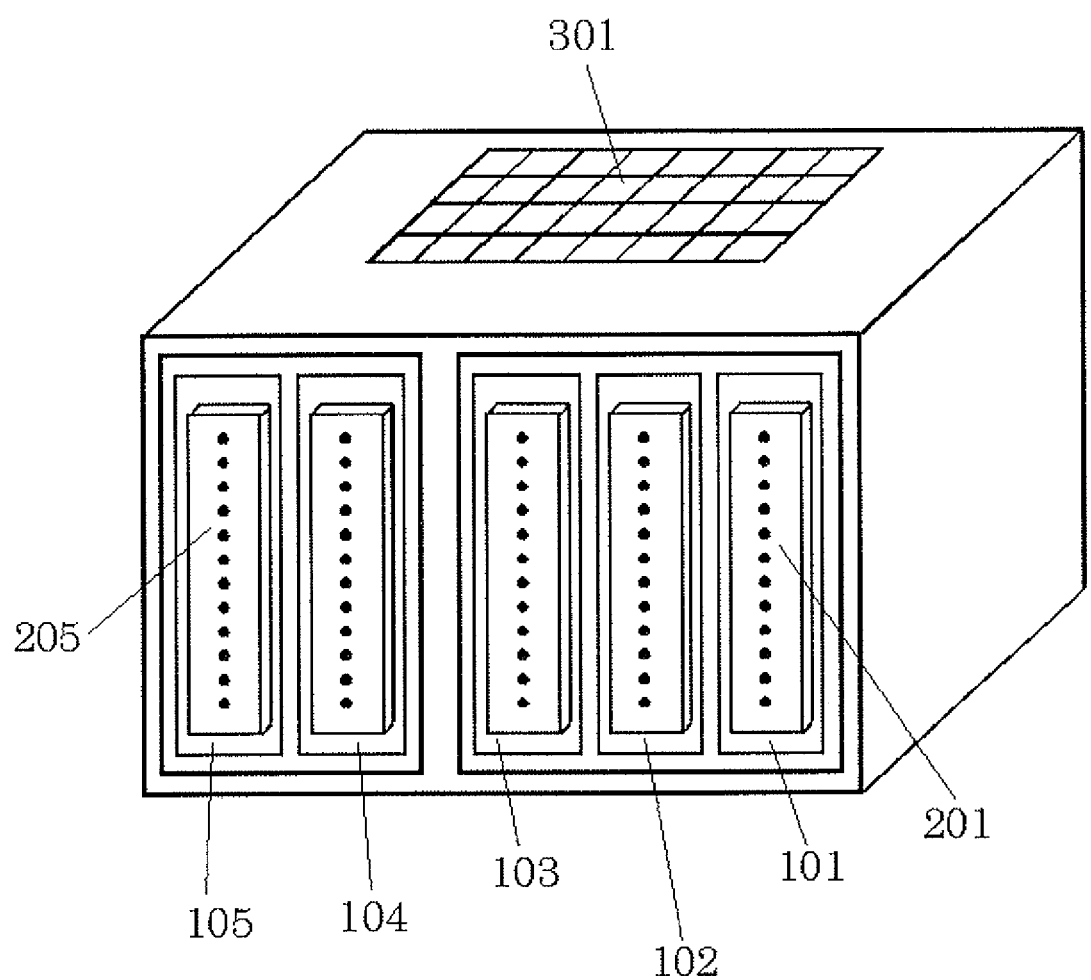
FIG. 8 is a schematic drawing illustrating an example of a recording head cartridge.

With reference to FIGS. 7 and 8, an ink jet recording apparatus capable of bi-directional recording will be described which is an image forming apparatus suitable for conducting recording using the above-mentioned black inks 1 and 2 and reactive color ink.

FIG. 7 is a schematic drawing illustrating an example of the ink jet recording apparatus. A chassis 10 is constructed of a plurality of plate-like metal members having a predetermined stiffness and forms a skeleton of the ink jet recording apparatus. To the chassis 10, are incorporates a feed section 11 for feeding a recording medium, a conveying section 13 for guiding the recording medium to a predetermined recording position as well as to a discharge section 12, a recording section for performing predetermined recording on the recording medium, and a head recovery section 14 for performing recovery operation for the recording section. The recording section includes a carriage 16 scannably supported along a carriage axis 15, a head cartridge removably mounted on the carriage 16 via a head set lever 17, and a carriage cover 20 for positioning the head cartridge at a predetermined mounting position. One end of a contact flexible print cable 22 (hereinafter, abbreviated as contact FPC) is connected to another engagement portion of the carriage 16 relative to the head cartridge. A contact portion (not shown) formed on one end of contact the FPC 22 and a contact portion 301, an external signal input terminal, provided on the head cartridge are electrically brought into contact with each other for transmission and reception of a variety of information and for supply of power to the head cartridge.

FIG. 8 is a schematic drawing illustrating an example of the head cartridge. Here, the cartridge will be described taking for example a case where a non-reactive yellow ink, a non-reactive magenta ink, a reactive cyan ink, a black ink 1, and a black ink 2 are used as an example of an ink set. In FIG. 8, 101, 102, 103, 104, and 105 are recording heads for the reactive cyan ink, non-reactive magenta ink, non-reactive yellow ink, black ink 1, and black ink 2, respectively. In addition, 201 and 205 are ejection orifice arrays for the cyan ink and black ink 2, respectively. In the recording head as shown in FIG. 8, electric signals such as recording signal are exchanged through the electric contact 301.

Here, as a form of a recording head as shown in FIG. 8, is described, with an example, a Bubble Jet (registered trade name)-type recording head to conduct recording using an electrothermal converter (recording element) which generates thermal energy for causing film boiling in an ink in response to an electric signal. For the typical structure and principle thereof, is preferable that using a basic principle as disclosed, for example, in U.S. Pat. Nos. 4,723,129 and 4,740,796. The system is applicable to each of the so-called on-demand type and continuous type. The on-demand type generates thermal energy by applying, to the electrothermal converter, at least one driving signal which gives rapid temperature rise exceeding nuclear boiling temperature in response to recording information. This generates film boiling on a heat-acting face of the recording head and can result in the formation of a bubble in the liquid (ink) corresponding one-to-one to a driving signal, showing that the on-demand type is effective. The growth and shrinkage of the bubble allows the ink to be ejected through an ejection orifice to form an ink droplet. Setting the driving signal into a pulse shape can immediately and appropriately produce the growth and shrinkage of a bubble to achieve ink ejection excellent particularly in responsiveness, and therefore is more preferable.

A second form of an ink jet recording apparatus using mechanical energy is provided with a nozzle formation substrate having a plurality of nozzles, a pressure generation element which is composed of piezoelectric and conductive materials and is arranged facing the nozzle, and an ink filling the surroundings of the pressure generation element. In this form, the pressure generation element is displaced by application of voltage to eject an ink droplet.

The ink jet recording apparatus used can be that in which the recording head and ink cartridge are either separated from each other or undetachably integrated with each other. The ink cartridge can be either that mounted on the carriage by detachable or undetachable integration with the recording head or that in such a form as to be provided in a fixed region of the ink jet recording apparatus to supply an ink to the recording head through an ink supply member such as a tube. In addition, when a structure for applying favorable negative pressure to the recording head is provide in the ink cartridge, the following structure may be used. Specifically, there may be adopted a form in which an absorber is placed in an ink housing section of the ink cartridge, or a form which has an flexible ink holding bag and a spring part for applying a biasing force thereto in the direction of increasing the inner volume thereof. Further, the ink jet recording apparatus may be that taking the form of a line printer in which recording elements are aligned over a range corresponding to the full width of a recording medium in addition to that using a serial recording method as described above.

EXAMPLES

The present invention is more specifically described below with reference to Examples and Comparative Examples. However, the invention is not intended to be limited thereto unless going beyond the gist thereof. In addition, "%" used in the following description is by mass unless otherwise noted.

(Preparation of Pigment Dispersion A)

To a solution of 5 g of concentrated hydrochloric acid dissolved in 5.5 g of water was added 1.5 g of 4-amino-1,2-benzenedicarboxylic acid in a state cooled at 5° C. A vessel containing the resultant solution was then placed in an ice bath. The solution was stirred and thereby kept constantly at 10° C. or less, to which a solution of 1.8 g of sodium nitrite dissolved in 9 g of water at 5° C. was then added. This solution was further stirred for 15 minutes, to which 6 g of a carbon black having a specific surface area of 220 m²/g and a DBP oil absorption of 105 mL/100 g was then added under stirring. Subsequently, the stirring was carried out for further 15 minutes. After filtering the resultant slurry with a filter paper (Standard Filter Paper No. 2 (trade name) from ADVANTEC), the particles were sufficiently washed with water and dried in an oven at 110° C. to prepare a self dispersion carbon black A. Water was further added to the self dispersion carbon black A obtained above to disperse the carbon black so as to have a pigment concentration of 10 mass %, thereby preparing a dispersion. By the above method, a pigment dispersion A was obtained in which the self dispersion carbon black A having a —$C_6H_3$—$(COONa)_2$ group introduced into the carbon black particle surface is dispersed in water.

In this respect, the ionizable group density of the above-prepared self dispersion carbon black A was measured and found to be 3.1 μmol/m². Here, the measurement of the ionizable group density was performed by measuring the sodium ion concentration in the above-prepared pigment dispersion A using an ion meter (from DKK-Toa Corporation); the resultant value was converted to the ionizable group density of the self dispersion carbon black A.

(Preparation of Pigment Dispersion B)

The sodium ions in the pigment dispersion A obtained above were replaced with ammonium ions by ion exchange to prepare self a dispersion carbon black B. Water was further added to the self dispersion carbon black B obtained above to disperse the carbon black so as to have a pigment concentration of 10 mass %, thereby preparing a dispersion. By the above method, a pigment dispersion B was obtained in which the self dispersion carbon black B having a —$C_6H_3$—$(COONH_4)_2$ group introduced into the carbon black particle surface is dispersed in water.

In this respect, the ionizable group density of the above-prepared self dispersion carbon black B was 3.1 μmol/m².

(Synthesis of Exemplified Compound M1)

The following compound (1), sodium carbonate, and benzoylacetic acid ethyl ester were reacted in xylene, followed by filtering and washing the reaction product. Meta-aminoacetanilide, copper acetate, and sodium carbonate were sequentially added thereto in N,N-dimethylformamide to conduct reaction, followed by filtering and washing the reaction product. The reaction product was further sulfonated in fuming sulfuric acid, then filtered and washed, and subjected to condensation reaction with cyanuric chloride in the presence of sodium hydroxide. Anthranilic acid was added to the reaction solution, which was then subjected to condensation reaction in the presence of sodium hydroxide. The reaction product was filtered and washed to provide the following exemplified compound M1.

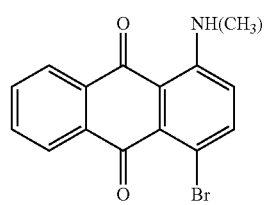

Compound (1)

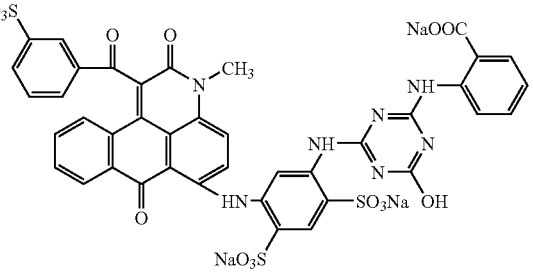

Exemplified Compound M1

Synthesis of Exemplified Compound C1

Synthesis of Tetrasodium Copper Phthalocyanine Tetrasulfonate (Compound (2))

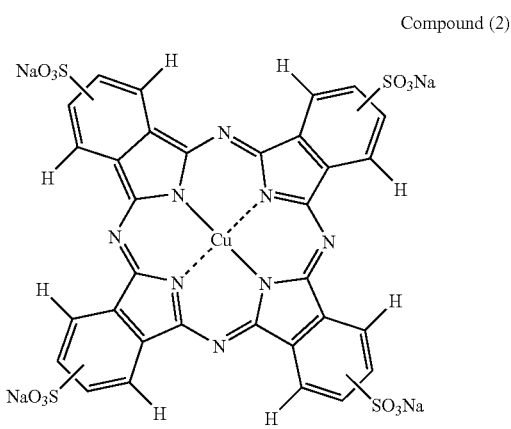

Compound (2)

Sulfolane, monosodium 4-sulfophthalate, ammonium chloride, urea, ammonium molybdate, and copper (II) chloride were mixed, stirred, and then washed with methanol. Subsequently, water was added thereto, and then the resultant solution was adjusted to a pH of 11 using a sodium hydroxide aqueous solution. A hydrochloric acid aqueous solution was added to the resultant solution under stirring, to which sodium chloride was further added slowly to precipitate a crystal. The resultant crystal was filtered off and washed with a 20% sodium chloride aqueous solution, to which methanol was subsequently added. The precipitated crystal was filtered off, washed with a 70% methanol aqueous solution, and then dried to provide tetrasodium copper phthalocyanine tetrasulfonate (compound (2)) as a blue crystal.

Synthesis of Copper Phthalocyanine Tetrasulfonic Acid Chloride (Compound (3))

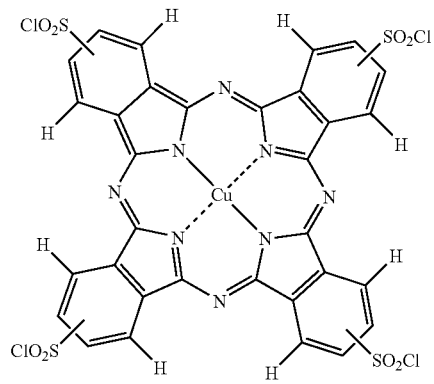

Compound (3)

The tetrasodium copper phthalocyanine tetrasulfonate (compound (2)) obtained above was added slowly to chlorosulfonic acid, to which thionyl chloride was further added dropwise to conduct reaction. The reaction solution was then cooled, followed by filtering the precipitated crystal to provide a wet cake of copper phthalocyanine tetrasulfonic acid chloride.

Synthesis of the Following Compound (4)

Compound (4) is a compound of general formula (V) in which Y is an amino group and $R_1$ and $R_2$ are sulfonic acid groups substituted at the 2- and 5-positions.

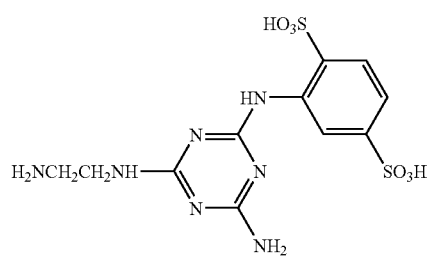

Compound (4)

Lipal OH, cyanuric chloride, and monosodium aniline-2,5-disulfonate were added to ice-cold water and reacted while adding a sodium hydroxide aqueous solution. A sodium hydroxide aqueous solution was then added to the reaction solution to adjust the reaction solution to a pH of 10. To the reaction solution were added 28% aqueous ammonia and ethylenediamine to conduct reaction. Sodium chloride and concentrated hydrochloric acid were dropwise added to the resultant reaction solution to precipitate a crystal. The precipitated crystal was filtered, sampled, and washed with a 20% sodium chloride aqueous solution to provide a wet cake. Methanol and water were added to the resultant wet cake, which was further filtered and washed with methanol followed by drying to provide compound (4).

(4) Synthesis of Exemplified Compound C1

The wet cake of copper phthalocyanine tetrasulfonic acid chloride (compound (3)) obtained in (2) was added to ice-cold water and suspended by stirring, to which aqueous ammonia and the compound (4) obtained in (3) were further added to conduct reaction. Water and sodium chloride was added to the reaction solution to precipitate a crystal. The resultant crystal was filtered, washed with a sodium chloride aqueous solution, again filtered, then washed and dried to provide exemplified compound C1 as a blue crystal. It is estimated from the above reaction that this compound is exemplified compound C1 and is a coloring material represented by formula (IV) where the average number of substituents is in the range of l=0, m=1.0 to 2.0, and n=2.0 to 3.0.

(Synthesis of Exemplified Compound Bk3)

The following compound (5) was added to and dissolved in water containing sodium carbonate, to which hydrochloric acid and sodium nitrite were further added for diazotization. A 6-phenylamino-1-hydroxynaphthalene-3-sulfonic acid aqueous solution was added to the diazo turbid solution to conduct dissolution in the presence of sodium carbonate to provide solution A. Next, 2-aminosulfonic acid was dissolved in the presence of sodium hydroxide, to which hydrochloric acid and sodium nitrite were then added to conduct diazotization. Subsequently, 6-amino-1-hydroxynaphthalene-3-sulfonic acid was dissolved in the presence of sodium hydroxide, to which acetic anhydride was then added for acetylation. The diazo turbid solution obtained above was dropwise added thereto in the presence of sodium carbonate to conduct coupling reaction, thereby obtaining a reaction solution C. Sodium hydroxide and then sodium chloride were added to the reaction solution C for salting-out to provide a compound. This compound was dissolved in water in the presence of sodium hydroxide, to which hydrochloric acid and sodium nitrite were then added to conduct diazotization. The solution A was dropwise added to this diazo turbid solution in the presence of sodium carbonate to complete the coupling reaction to provide a reaction solution. This reaction solution was salted out with sodium chloride and then filtered to provide a compound D. To N,N-dimethylformamide were added 2-nitro-4-cresol, toluene, and potassium hydroxide, which was then azeotroped with toluene to distill water away, followed by dropwise adding propane sultone. Sodium hydroxide was subsequently added thereto, which was then concentrated, followed by adding palladium-carbon in an autoclave and filling with hydrogen gas to provide a solution. Hydrochloric acid and sodium nitrite were added thereto for diazotization, to which the reaction solution C obtained above was then added dropwise, followed by completing the coupling reaction in the presence of sodium hydroxide to provide a reaction solution. Hydrochloric acid and sodium nitrite were added to the reaction solution for diazotization, followed by adding this diazo turbid solution to an aqueous solution of the above compound D to complete the coupling reaction. The resultant was subjected to salting-out with sodium chloride, filtered, and washed to provide exemplified compound Bk3.

Compound (5)

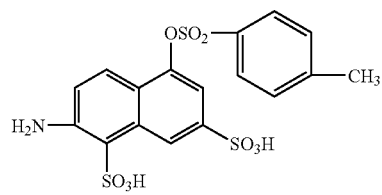

Compound Bk3

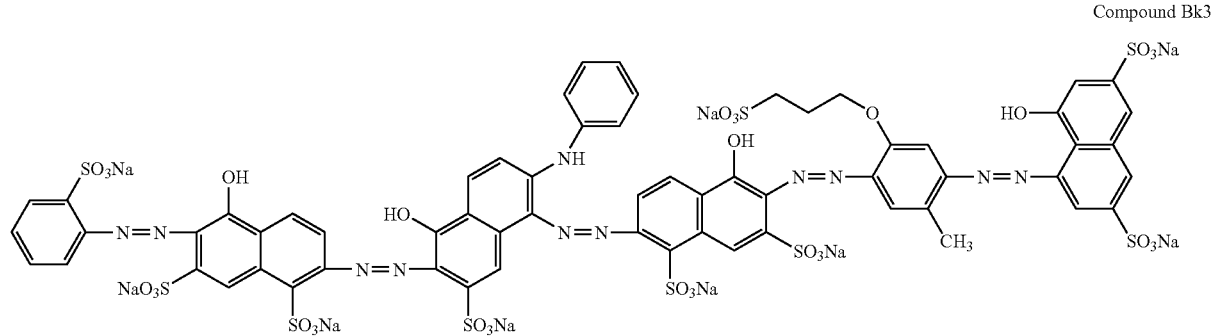

(Synthesis of Exemplified Compound Bk4)

The following compound (6) was added to and dissolved in water containing sodium hydroxide, to which a sodium nitrite aqueous solution was further added for diazotization. This diazo turbid solution was dropwise added to an alkali aqueous solution of 6-amino-1-hydroxynaphthalene-3,5-disulfonic acid to conduct coupling reaction, which was then salted out with sodium chloride, filtered, and washed. The above compound was subsequently added to and dissolved in water containing sodium hydroxide, to which hydrochloric acid and sodium nitrite were then added for diazotization. To this diazo turbid solution were added 8-amino-1-hydroxynaphthalene-3,6-disulfonic acid and sodium carbonate, which was then stirred overnight to provide reaction a solution B. Next, 1-amino-2-benzenesulfonic acid was added to and dissolved in water containing sodium hydroxide, to which sodium nitrite was further added for diazotization. This diazo turbid solution was dropwise added to an alkali solution of 6-amino-1-hydroxynaphthalene-3-sulfonic acid to conduct coupling reaction, which was then salted out with sodium chloride and then filtered and washed. Subsequently, the above compound was added to and dissolved in water containing sodium hydroxide, to which hydrochloric acid and sodium nitrite were then added for diazotization. This diazo turbid solution was added to the above reaction solution B to conduct coupling reaction, which was then salted out with sodium chloride and then filtered and washed to provide the following exemplified compound Bk4.

Compound (6)

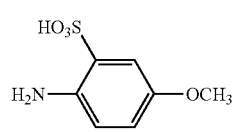

Exemplified Compound Bk4

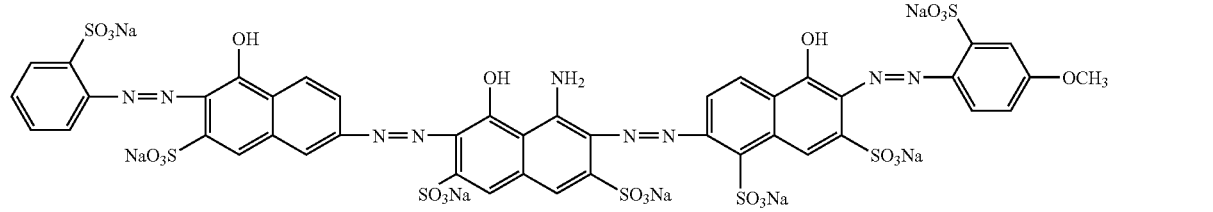

(Preparation of Inks)

Components shown in each of the following Tables 2 to 5 were mixed, thoroughly stirred for dissolution or dispersion, and then subjected to pressure filtration using a microfilter (from Fuji Photo Film) having a pore size of 0.3 μm for black ink 1 or 0.2 μm for the other inks to prepare inks.

Chroma in the CIELab color space was measured for a liquid obtained by diluting each reactive color ink by 2,000 times in mass with pure water. Lightness in the CIELab color space was also measured for a liquid obtained by diluting black ink 2 by 2,000 times in mass with pure water. An ultraviolet and visible spectrophotometer L-4200 (from Hitachi Ltd.) was used for measurement of lightness and chroma. The value of chroma of each reactive color ink and the value of lightness of black ink 2 are shown in Tables 3 and 5, respectively.

TABLE 2

| | Black ink 1 | |
| --- | --- | --- |
| | BK1-1 | BK1-2 |
| Pigment dispersion B | 35.00 | 35.00 |
| Glycerin | 8.00 | 7.00 |
| Diethylene glycol | 4.00 | 3.00 |
| 2-Pyrrolidone | 5.00 | 3.00 |
| Trimethylolpropane | 4.00 | 3.00 |
| Acetylenol E100 (*1) | 0.15 | 0.15 |
| Ammonium sulfate | 0.33 | 0.33 |
| Pure water | 43.52 | 48.52 |
| Water content [mass %] | 75.02 | 80.02 |
| Surface tension of ink [mN/m] | 40.00 | 40.00 |

(*1) Acetylene glycol-ethylene oxide adduct (Surfactant; from Kawaken Fine Chemicals Co., Ltd.)

TABLE 3

| | Reactive color ink | | | | | | | | | | |
| --- | --- | --- | --- | --- | --- | --- | --- | --- | --- | --- | --- |
| | Cyan | | | | | Magenta | | | Yellow | | |
| | C1-1 | C1-2 | C1-3 | C1-4 | C1-5 | M1-1 | M1-2 | M1-3 | Y1-1 | Y1-2 | Y1-3 |
| Exemplified compound C1 | 5.5 | 5.5 | | | | | | | | | |
| C.I. Direct Blue 199 | | | 5.5 | | | | | | | | |
| C.I. Acid Blue 9 | | | | 4.0 | 4.0 | | | | | | |
| Exemplified compound M1 | | | | | | 6.0 | | | | | |
| C.I. Acid Red 289 | | | | | | | 3.0 | 3.0 | | | |
| C.I. Acid Yellow 23 | | | | | | | | | 3.0 | 3.0 | 3.0 |
| Glycerin | | | 10.0 | 8.0 | 7.0 | 8.0 | | 7.0 | 10.0 | 8.0 | 8.0 |
| 2-Pyrrolidone | | | 5.0 | 3.0 | 3.0 | 4.0 | | 3.0 | 5.0 | 5.0 | 3.0 |
| Ethylene urea | 10.0 | 10.0 | 5.0 | 4.2 | 3.0 | 5.0 | 10.0 | 3.0 | 5.0 | 5.0 | 3.0 |
| 1,6-Hexanediol | 7.0 | 7.0 | | | | 7.0 | | | | | |
| Polyethylene glycol (*1) | 3.0 | 3.0 | | | | 3.0 | | | | | |
| Trimethylolpropane | 3.0 | 3.0 | | | | 3.0 | | | | | |
| 1,2,6-Hexanetriol | 3.0 | 3.0 | | | | 3.0 | | | | | |
| 2-Propanol | 2.0 | 2.0 | | | | 2.0 | | | | | |
| Acetylenol E100 (*2) | 0.6 | 0.6 | 0.6 | 0.6 | 0.6 | 0.6 | 1.2 | 0.6 | 0.6 | 0.6 | 0.6 |
| Magnesium nitrate | 2.5 | | 2.5 | 2.5 | 2.5 | 2.5 | 2.5 | 2.5 | 2.5 | | |
| Calcium nitrate | | 3.0 | | | | | | | | 3.0 | 3.0 |
| Pure water | 63.4 | 62.9 | 71.4 | 77.7 | 79.9 | 76.9 | 62.3 | 80.9 | 73.9 | 75.4 | 79.4 |
| Water content [mass %] | 63.4 | 62.9 | 71.4 | 77.7 | 79.9 | 76.9 | 62.3 | 80.9 | 73.9 | 75.4 | 79.4 |
| Surface tension of ink [mN/m] | 36.0 | 36.0 | 33.0 | 34.0 | 34.0 | 35.0 | 35.0 | 35.0 | 34.0 | 33.0 | 33.0 |
| Chroma of ink (*3) | 48 | 48 | 58 | 58 | 58 | 68 | 59 | 68 | 70 | 70 | 70 |

(*1) Average molecular weight: 200
(*2) Acetylene glycol-ethylene oxide adduct (Surfactant; from Kawaken Fine Chemicals Co., Ltd.)
(*3) Chroma of liquid of ink diluted by 2,000 times in mass with water

TABLE 4

| | Non-reactive color ink | | |
| --- | --- | --- | --- |
| | Cyan | Magenta | Yellow |
| | C2-1 | M2-1 | Y2-1 |
| Exemplified compound C1 | 5.5 | | |
| C.I. Acid Red 289 | | 3.0 | |
| C.I. Acid Yellow 23 | | | 3.0 |
| Glycerin | | 10.0 | 10.0 |
| 2-Pyrrolidone | | 5.0 | 5.0 |
| Ethylene urea | 10.0 | 5.0 | 5.0 |
| 1,6-Hexanediol | 7.0 | | |
| Polyethylene glycol (*1) | 3.0 | | |
| Trimethylolpropane | 3.0 | | |
| 1,2,6-Hexanetriol | 3.0 | | |
| 2-Propanol | 2.0 | | |
| Acetylenol E100 (*2) | 0.6 | 0.6 | 0.6 |
| Pure water | 65.9 | 76.4 | 76.4 |
| Water content [mass %] | 65.9 | 76.4 | 76.4 |
| Surface tension of ink [mN/m] | 36.0 | 35.0 | 34.0 |

(*1) Average molecular weight: 200
(*2) Acetylene glycol-ethylene oxide adduct (Surfactant; from Kawaken Fine Chemicals Co., Ltd.)

TABLE 5

| | Black ink 2 | | |
| --- | --- | --- | --- |
| | BK2-1 | BK2-2 | BK2-3 |
| Black Dye Bk3 | 2.4 | | |
| Black Dye Bk4 | 1.2 | | |
| C.I. Direct Orange 39 | 1.4 | | |
| C.I. Food Black 2 | | 5.0 | 5.0 |
| Glycerin | 8.0 | 8.0 | 8.0 |
| 2-Pyrrolidone | | 3.9 | 3.0 |
| Ethylene urea | 9.0 | 5.0 | 3.0 |
| Ethylene glycol | 9.0 | | |
| 1,5-Pentanediol | 3.0 | | |
| Acetylenol E100 (*1) | 0.6 | 0.6 | 0.6 |
| Pure water | 65.4 | 77.5 | 80.4 |
| Water content [mass %] | 65.4 | 77.5 | 80.4 |
| Surface tension of ink [mN/m] | 33.0 | 33.0 | 33.0 |
| Lightness of ink (*2) | 43 | 48 | 48 |

(*1) Acetylene glycol-ethylene oxide adduct (Surfactant; from Kawaken Fine Chemicals Co., Ltd.)
(*2) Lightness of liquid of ink diluted by 2,000 times in mass with water

[Evaluation]

(Reactivity of a Mixed Ink of a Color Ink and Black Ink 1)

Black ink 1 (20 g) and a color ink shown in Table 6 below (20 g) were mixed and thoroughly stirred to prepare a mixed ink, followed by allowing the mixed ink to stand for about 24 hours. Then, the presence of precipitates or aggregates in the mixed ink was visually identified to evaluate the reactivity. The evaluation results are shown in Table 6.

TABLE 6

|  |  | Color ink |  | Black ink 1 | Presence of precipitates or aggregates |
|---|---|---|---|---|---|
| Mixed ink | 1 | Reactive color ink | C1-1 | BK1-1 | Yes |
|  | 2 |  | C1-2 | BK1-1 | Yes |
|  | 3 |  | C1-3 | BK1-1 | Yes |
|  | 4 |  | C1-4 | BK1-1 | Yes |
|  | 5 |  | M1-1 | BK1-1 | Yes |
|  | 6 |  | M1-2 | BK1-1 | Yes |
|  | 7 |  | Y1-1 | BK1-1 | Yes |
|  | 8 |  | Y1-2 | BK1-1 | Yes |
|  | 9 |  | C1-5 | BK1-2 | Yes |
|  | 10 |  | M1-3 | BK1-2 | Yes |
|  | 11 |  | Y1-3 | BK1-2 | Yes |
|  | 12 | Non-reactive color ink | C2-1 | BK1-1 | No |
|  | 13 |  | M2-1 | BK1-1 | No |
|  | 14 |  | Y2-1 | BK1-1 | No |

Table 6 shows that the reactive inks C1-1, C1-2, C1-3, C1-4, C1-5, M1-1, M1-2, M1-3, Y1-1, Y1-2, and Y1-3 are inks unstabilizing the dispersion state of the pigment in black ink 1.

(Color Unevenness)

As shown in Table 7 below, inks were combined to form a solid black image by a image forming method involving applying, to a region to which black ink 1 is to be applied, the black ink and other inks so as to overlap. The image forming apparatus used was one obtained by modification of the ink jet recording apparatus BJF850 (from Canon Inc.) capable of bi-directional recording. The recording media used were 4 types of plain papers, Canon Extra, Canon Office Multi-Function Applications, EN100, and a high color developing plain paper Super White Paper SW101 (all from Canon). The inks were applied to a recording medium so as to overlap on the medium in the order of a pre-application ink, black ink 1, and a post-application ink as described in Table 7 below. The image was formed by single-pass bi-directional recording. Here, for the black ink 1 and the other inks, the application amounts of ink were set to about 28 ng and about 2 ng, respectively, per 1/600 square inch.

For each of images obtained using the 4 types of recording media, an image formed by the forward recording process and an image formed by the return recording process were evaluated by visual identification thereof; the mean thereof was used as an evaluation result of color unevenness in each of the Examples and Comparative Examples. In addition, the color unevenness in Examples 1 to 12 and Comparative Examples 1 to 4 was relatively evaluated on 5 scales, A, B, C, D, and E. Specifically, the evaluation was performed by defining the most favorable color evenness as A and the most poor color evenness as E. Of the 5 scales A, B, C, D, and E, A and B were determined to represent the acceptable levels of color unevenness currently needed. The evaluation results are shown in Table 7.

(Bleeding)

An image was formed in which the same solid black image as that formed for the above evaluation of color unevenness is adjacent to solid images formed with color inks. Here, the color inks used were the non-reactive color inks of yellow ink Y2-1 and magenta ink M2-1. The image forming apparatus used was one obtained by modification of the ink jet recording apparatus BJF850 (from Canon Inc.) capable of bi-directional recording. The recording media used were 4 types of plain papers, Canon Extra, Canon Office Multi-Function Applications, EN100, and a high color developing plain paper Super White Paper SW101 (all from Canon).

The inks were applied to a recording medium so as to overlap on the medium in the order of a pre-application ink, black ink 1, and a post-application ink as described in Table 7 below. The image was formed by single-pass bi-directional recording. Here, for the black ink 1 and the other inks, the application amounts of ink were set to about 28 ng and about 14 ng, respectively, per 1/600 square inch.

For each of images obtained using the 4 types of recording media, bleeding in the boundary between the black and color images was evaluated by visual identification thereof; the mean thereof was used as an evaluation result of bleeding in each of the Examples and Comparative Examples. In addition, the bleeding in Examples 1 to 12 and Comparative Examples 1 to 4 was relatively evaluated on 3 scales, A, B, and C. Specifically, the evaluation was performed by defining the most favorable bleeding resistance as A and the most poor bleeding resistance as C. Of the 3 scales A, B, and C, A and B were determined to represent the acceptable levels of bleeding currently needed. The evaluation results are shown in Table 7.

TABLE 7

|  |  |  | Pre-application ink | Black ink 1 | Post-application ink | Color unevenness | Bleeding resistance |
|---|---|---|---|---|---|---|---|
| Example | 1 | Forward recording process | C1-1 | BK1-1 | BK2-1 | A | A |
|  |  | Return recording process | BK2-1 | BK1-1 | C1-1 |  |  |
|  | 2 | Forward recording process | C1-2 | BK1-1 | BK2-1 | A | A |
|  |  | Return recording process | BK2-1 | BK1-1 | C1-2 |  |  |
|  | 3 | Forward recording | C1-3 | BK1-1 | BK2-1 | A | A |

TABLE 7-continued

| | | | Pre-application ink | Black ink 1 | Post-application ink | Color unevenness | Bleeding resistance |
|---|---|---|---|---|---|---|---|
| | | process | | | | | |
| | | Return recording process | BK2-1 | BK1-1 | C1-3 | | |
| | 4 | Forward recording process | C1-4 | BK1-1 | BK2-1 | A | A |
| | | Return recording process | BK2-1 | BK1-1 | C1-4 | | |
| | 5 | Forward recording process | M1-1 | BK1-1 | BK2-1 | A | A |
| | | Return recording process | BK2-1 | BK1-1 | M1-1 | | |
| | 6 | Forward recording process | M1-2 | BK1-1 | BK2-1 | A | A |
| | | Return recording process | BK2-1 | BK1-1 | M1-2 | | |
| Example | 7 | Forward recording process | Y1-1 | BK1-1 | BK2-1 | A | A |
| | | Return recording process | BK2-1 | BK1-1 | Y1-1 | | |
| | 8 | Forward recording process | Y1-2 | BK1-1 | BK2-1 | A | A |
| | | Return recording process | BK2-1 | BK1-1 | Y1-2 | | |
| | 9 | Forward recording process | C1-1 | BK1-1 | BK2-2 | A | A |
| | | Return recording process | BK2-2 | BK1-1 | C1-1 | | |
| | 10 | Forward recording process | C1-5 | BK1-2 | BK2-3 | A | B |
| | | Return recording process | BK2-3 | BK1-2 | C1-5 | | |
| | 11 | Forward recording process | M1-3 | BK1-2 | BK2-3 | A | B |
| | | Return recording process | BK2-3 | BK1-2 | M1-3 | | |
| | 12 | Forward recording process | Y1-3 | BK1-2 | BK2-3 | A | B |
| | | Return recording process | BK2-3 | BK1-2 | Y1-3 | | |
| Comparative Example | 1 | Forward recording process | C2-1 | BK1-1 | BK2-1 | E | C |
| | | Return recording process | BK2-1 | BK1-1 | C2-1 | | |
| | 2 | Forward recording process | C1-1 | BK1-1 | M2-1 | C | A |
| | | Return recording process | M2-1 | BK1-1 | C1-1 | | |
| | 3 | Forward recording process | C1-1 | BK1-1 | Y2-1 | C | A |
| | | Return recording process | Y2-1 | BK1-1 | C1-1 | | |

TABLE 7-continued

|   |  | Pre-application ink | Black ink 1 | Post-application ink | Color unevenness | Bleeding resistance |
|---|---|---|---|---|---|---|
|   | process |  |  |  |  |  |
| 4 | Forward recording process | C1-1 | BK1-1 | Non | D | A |
|   | Return recording process | Non | BK1-1 | C1-1 |  |  |

While the present invention has been described with reference to exemplified embodiments, it is to be understood that the invention is not limited to the disclosed exemplified embodiments. The scope of the following claims is to be accorded the broadest interpretation so as to encompass all such modifications and equivalent structures and functions.

This application claims the benefit of Japanese Patent Application No. 2006-064316, filed Mar. 9, 2006, which is hereby incorporated by reference herein in its entirety.

What is claimed is:

1. An image forming method using a black ink 1 comprising a pigment, a black ink 2 comprising a dye, and a reactive color ink capable of unstabilizing the dispersion state of the pigment in the black ink 1,
  wherein the method comprises one of the steps of, on at least part of a region to which the black ink 1 is to be applied, applying the reactive color ink, the black ink 1, and the black ink 2 in that order so as to overlap, thereby applying these inks to a recording medium; and applying the black ink 2, the black ink 1, and the reactive color ink in that order so as to overlap, thereby applying these inks to a recording medium.

2. The image forming method according to claim 1, wherein each of the black ink 1, the black ink 2, and the reactive color ink has a water content of 78.0 mass % or less.

3. An image forming method for forming an image by bi-directional recording using a black ink 1 comprising a pigment, a black ink 2 comprising a dye, and a reactive color ink capable of unstabilizing the dispersion state of the pigment in the black ink 1,
  wherein the method includes the steps of, on at least part of a region to which the black ink 1 is to be applied, (1) applying the reactive color ink, the black ink 1, and the black ink 2 in that order so as to overlap, thereby applying these inks to a recording medium; and (2) applying the black ink 2, the black ink 1, and the reactive color ink in that order so as to overlap, thereby applying these inks to a recording medium, and
  wherein a forward recording process of the bi-directional recording includes one of the steps (1) and (2) and a return recording process of the bi-directional recording includes the other step.

4. The image forming method according to claim 3, wherein each of the black ink 1, the black ink 2, and the reactive color ink has a water content of 78.0 mass % or less.

5. An image forming apparatus using a black ink 1 comprising a pigment, a black ink 2 comprising a dye, and a reactive color ink capable of unstabilizing the dispersion state of the pigment in the black ink 1,
  wherein the apparatus includes either one of a unit for, on at least part of a region to which the black ink 1 is to be applied, applying the reactive color ink, the black ink 1, and the black ink 2 in that order so as to overlap, thereby applying these inks to a recording medium; and a unit for, on at least part of a region to which the black ink 1 is to be applied, applying the black ink 2, the black ink 1, and the reactive color ink in that order so as to overlap, thereby applying these inks to a recording medium.

6. The image forming apparatus according to claim 5, wherein each of the black ink 1, the black ink 2, and the reactive color ink has a water content of 78.0 mass % or less.

7. An ink jet recording apparatus having a unit for forming an image by bi-directional recording and using a black ink 1 comprising a pigment, a black ink 2 comprising a dye, and a reactive color ink capable of unstabilizing the dispersion state of the pigment in the black ink 1,
  wherein the apparatus includes at least a unit 1 for, on at least part of a region to which the black ink 1 is to be applied, applying the reactive color ink, the black ink 1, and the black ink 2 in that order so as to overlap, thereby applying these inks to a recording medium; and a unit 2 for, on at least part of a region to which the black ink 1 is to be applied, applying the black ink 2, the black ink 1, and the reactive color ink in that order so as to overlap, thereby applying these inks to the recording medium, and
  wherein a forward recording process of the bi-directional recording uses one of the units 1 and 2 and a return recording process of the bi-directional recording uses the other unit.

8. The ink jet recording apparatus according to claim 7, each of the black ink 1, the black ink 2, and the reactive color ink has a water content of 78.0 mass % or less.

* * * * *